(12) United States Patent
Hosaka et al.

(10) Patent No.: US 7,869,659 B2
(45) Date of Patent: Jan. 11, 2011

(54) IMAGE-COMPARING APPARATUS, IMAGE-COMPARING METHOD, IMAGE-RETRIEVING APPARATUS AND IMAGE-RETRIEVING METHOD

(75) Inventors: Kazuhisa Hosaka, Tokyo (JP); Takahiro Fukuhara, Kanagawa (JP)

(73) Assignee: Sony Corporation, Tokyo (JP)

( * ) Notice: Subject to any disclaimer, the term of this patent is extended or adjusted under 35 U.S.C. 154(b) by 1299 days.

(21) Appl. No.: 11/392,037

(22) Filed: Mar. 29, 2006

(65) Prior Publication Data
US 2006/0222249 A1   Oct. 5, 2006

(30) Foreign Application Priority Data
Mar. 31, 2005   (JP) ............................ P2005-104374

(51) Int. Cl.
G06K 9/46 (2006.01)
G06K 9/66 (2006.01)
G06K 9/36 (2006.01)

(52) U.S. Cl. ........................................ 382/232; 382/190
(58) Field of Classification Search .................. 382/232, 382/190
See application file for complete search history.

(56) References Cited

U.S. PATENT DOCUMENTS 5,870,754 A * 2/1999 Dimitrova et al. ........... 707/104
6,363,381 B1 * 3/2002 Lee et al. ....................... 707/6
2005/0100219 A1 * 5/2005 Berkner et al. ............... 382/190

FOREIGN PATENT DOCUMENTS

| JP | 11 238067 | 8/1999 |
|---|---|---|
| JP | 11 316837 | 11/1999 |
| JP | 2000 48036 | 2/2000 |
| JP | 2001 160062 | 6/2001 |
| JP | 2002 117407 | 4/2002 |
| JP | 2004 38482 | 2/2004 |
| JP | 2004 45565 | 2/2004 |
| JP | 2004 186902 | 7/2004 |
| JP | 2005 65168 | 3/2005 |

* cited by examiner

*Primary Examiner*—Bhavesh M Mehta
*Assistant Examiner*—Bernard Krasnic
(74) *Attorney, Agent, or Firm*—Frommer Lawrence & Haug LLP; William S. Frommer; Paul A. Levy

(57) ABSTRACT

An image-comparing apparatus is provided for comparing a code stream obtained by encoding a retrieved image with a specific image for determining whether the code stream is substantially identical to the specific image. The apparatus includes image-characteristic amount extracting unit for analyzing the code stream to extract an image-characteristic amount of the retrieved image. The apparatus further includes encoding-parameter extracting unit for extracting an encoding parameter from the code stream and encoded-data generating unit for encoding the specific image to some extent, on the basis of the encoding parameter, in order to generate encoded specific-image data. A comparing unit compares the image-characteristic amount of the retrieved image with the encoded specific-image data is also provided to determine whether the code stream is substantially identical to the specific image.

20 Claims, 20 Drawing Sheets

IMAGE-COMPARING APPARATUS, IMAGE-COMPARING METHOD, IMAGE-RETRIEVING APPARATUS AND IMAGE-RETRIEVING METHOD

CROSS REFERENCE TO RELATED APPLICATIONS

The present invention contains subject matter related to Japanese Patent Application JP 2005-104374 filed in the Japanese Patent Office on Mar. 31, 2005, the entire contents of which are incorporated herein by reference.

BACKGROUND OF THE INVENTION

1. Field of the Invention

The present invention relates to an image-comparing apparatus and an image-comparing method, each for comparing compressed and encoded images with a specific image to determine whether they are identical or similar to the specific image. The invention also relates to an image-retrieving apparatus and an image-retrieving method, each for retrieving images substantially identical to a specific image, from compressed and encoded video contents.

2. Description of the Related Art

A technique of retrieving images substantially identical to a specific image, from unknown video contents, by using the specific image as retrieval query, has been demanded for the purpose of retrieving images from, for example, video contents. Jpn. Pat. Appln. Laid-Open Publication No. 2004-45565, for example, proposes the technique of extracting the characteristic amount of each frame from the video contents within a short time, generating a characteristic vector for the frame. The characteristic vector of each fame is compared with the characteristic vector of a specific image. Thus, images substantially identical to the specific image are retrieved from the video contents.

SUMMARY OF THE INVENTION

In recent years, digital apparatuses such as digital cameras and digital camcoders have come into general use. Images are often photographed with these digital apparatuses. The data representing the images are compressed and recorded. Further, television programs are converted to digital data items, and these data items are subjected to image compression. The image-compressed data items are stored as archive. In this regard, it was decided in 2004 that JPEG (Joint Photographic Experts Group) 2000 scheme should be employed as the image compression system, thereby to promote the digital-cinema standardization. As a result, many movie films have been converted to digital data items. The current trend is that these data items are compressed and encoded in accordance with the JPEG 2000 scheme.

In view of this, it will be increasingly demanded that images substantially identical to a specific image be retrieved from many compressed and encoded images or from many compressed and encoded video contents. In the conventional technique disclosed in Publication 2004-45565 and the like, however, the images or video contents must be completely decoded before the images identical to the specific image are retrieved. Here arises a problem. A great amount of data must be processed in order to retrieve any image.

The present invention has been made in view of the above. It is desirable to provide an image-comparing apparatus and an image-comparing method, which compare compressed and encoded images with a specific image to determine whether they are identical to the specific image, without completely decoding the compressed and encoded images. It is also desired to provide an image-retrieving apparatus and an image-retrieving method, which retrieves images substantially identical to a specific image, from compressed and encoded video contents, without completely decoding the compressed and encoded video contents.

According to the present invention, there is provided an image-comparing apparatus for comparing a code stream obtained by encoding a retrieved image, with a specific image, thereby to determine whether the code stream is substantially identical to the specific image. The apparatus includes: an image-characteristic amount extracting means for analyzing the code stream, thereby to extract an image-characteristic amount of the retrieved image; an encoding-parameter extracting means for extracting a encoding parameter from the code stream; an encoded-data generating means for encoding the specific image to some extent, on the basis of the encoding parameter, thereby to generate encoded specific-image data; and a comparing means for comparing the image-characteristic amount of the retrieved image with the encoded specific-image data, thereby to determine whether the code stream is substantially identical to the specific image.

According to this invention, there is provided an image-comparing method of comparing a code stream obtained by encoding a retrieved image, with a specific image, thereby to determine whether the code stream is substantially identical to the specific image. The method includes the steps of: analyzing the code stream, thereby to extract an image-characteristic amount of the retrieved image; extracting a encoding parameter from the code stream; encoding the specific image to some extent, on the basis of the encoding parameter, thereby to generate encoded specific-image data; and comparing the image-characteristic amount of the retrieved image with the encoded specific-image data, thereby to determine whether the code stream is substantially identical to the specific image.

According to this invention, there is provided an image-retrieving apparatus for retrieving a code stream substantially identical to the specific image from a code-stream train obtained by encoding a plurality of images. This apparatus includes: an image-characteristic amount extracting means for analyzing each of code streams constituting the code-stream train and extracting an image-characteristic amount of each of the code streams; an encoding-parameter extracting means for extracting an encoding parameter from the code stream; an encoded-data generating means for encoding the specific image to some extent, on the basis of the encoding parameter, thereby to generate encoded specific-image data; and a retrieving means for comparing the image-characteristic amount of the code stream with the encoded specific-image data, thereby to determine whether the code stream is substantially identical to the specific image, and retrieving, from the code-stream train, the code stream substantially identical to the specific image.

According to the present invention, there is provided an image-retrieving method of retrieving a code stream substantially identical to the specific image from a code-stream train obtained by encoding a plurality of images. The method includes the steps of: analyzing each of code streams constituting the code-stream train, thereby to extract an image-characteristic amount of each of the code streams; extracting an encoding parameter from the code stream; encoding the specific image to some extent, on the basis of the encoding parameter, thereby to generate encoded specific-image data; and comparing the image-characteristic amount of the code stream with the encoded specific-image data, thereby to determine whether the code stream is substantially identical to the specific image, and retrieving, from the code-stream train, the code stream substantially identical to the specific image.

In the image-comparing apparatus and the image-comparing method, according to this invention, a characteristic amount is extracted from a code stream obtained by encoding an image, and a similar characteristic amount is extracted from a specific image, too. These characteristic amounts are compared with each other. Thus, it can be determined whether a code stream is identical to the specific image, without decoding the code stream completely.

In the image-retrieving apparatus and the image-retrieving method, according to this invention, a characteristic amount is extracted from each of code streams constituting a code-stream train obtained by encoding a plurality of images, and a similar characteristic amount is extracted from a specific image, too. These characteristic amounts are compared with each other. Thus, a code stream substantially identical to the specific image can be retrieved from the code-stream train, without decoding the code stream completely.

DETAILED DESCRIPTION OF THE PREFERRED EMBODIMENTS

Specific embodiments of this invention will be described in detail, with reference to the accompanying drawings. The embodiments to which this invention is applied and which will be described below, are image-comparing apparatuses and methods that compare images compressed and encoded in accordance with the JPEG 2000 scheme, with a specific image, thereby to determine whether the images are identical to the specific image or how much they are similar to the specific image, and are image-retrieving apparatus and methods that retrieve images substantially identical to a specific image, from video contents compressed and encoded in accordance with the JPEG 2000 scheme.

Before the specific embodiments are described, there will be explained an image-encoding apparatus for encoding an image in accordance with the JPEG 2000 scheme and generating a code stream, and an image-decoding apparatus for decoding a code stream in accordance with the JPEG 2000 scheme and generating a decoded image.

Figure 1:
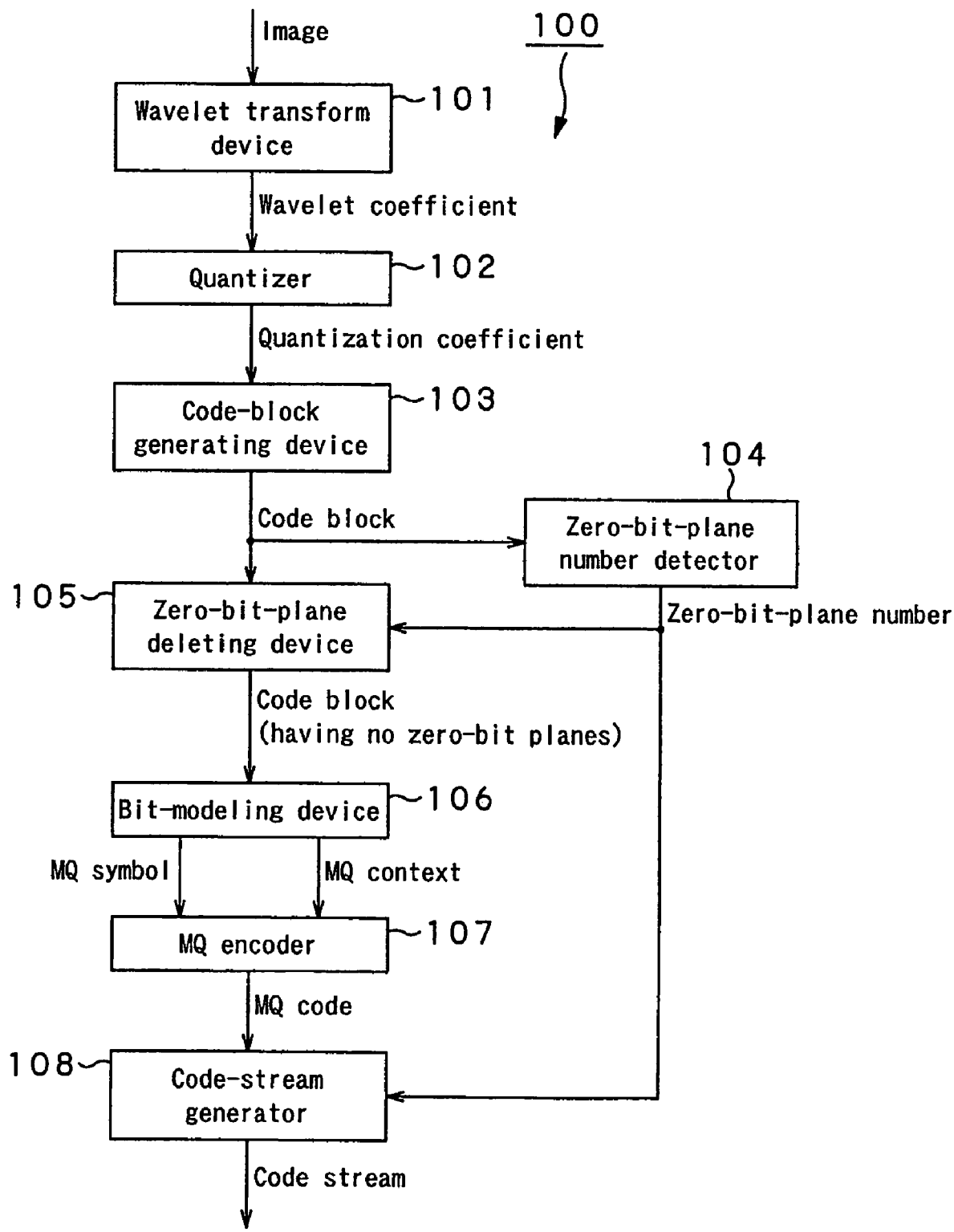
FIG. 1 is a block diagram showing the schematic configuration of an image-encoding apparatus that encodes an image in accordance with the JPEG 2000 scheme and generates a code stream.

The block diagram of FIG. 1 shows the schematic configuration of an image-encoding apparatus that encodes an image in accordance with the JPEG 2000 scheme and generates a code stream.

Figure 2:
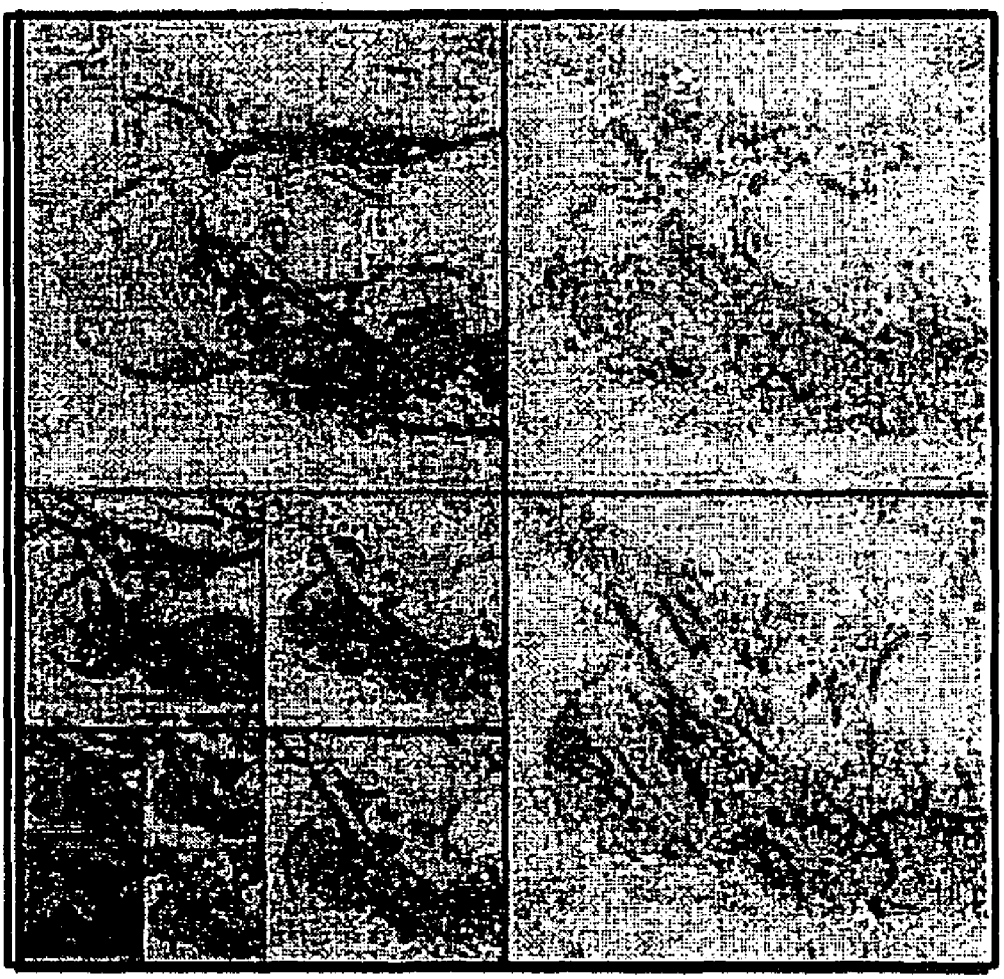
FIG. 2 is a diagram depicting an example of wavelet transform performed in accordance with the JPEG 2000 scheme.

In the image-encoding apparatus 100 shown in FIG. 1, a wavelet transform device 101 performs wavelet transform on an input image and generates a wavelet coefficient for each sub-band. In the JPEG 2000 scheme, the wavelet transform is a Mallat division in which a two-dimensional (xy coordinates) filter performs a filtering process as illustrated in FIG. 2, thus achieving a recurrent filtering process for low sub-bands. In the example of FIG. 2, the wavelet transform is repeated three times, forming ten sub-bands in all.

Figure 3A:
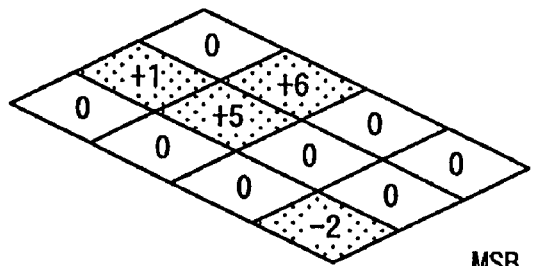
FIGS. 3A and 3B are diagrams representing the relation between a code block and bit planes.
Figure 3B:
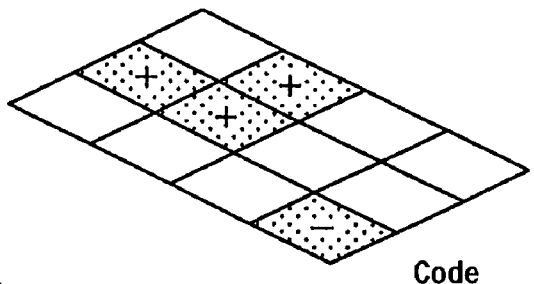
Figure 3B:
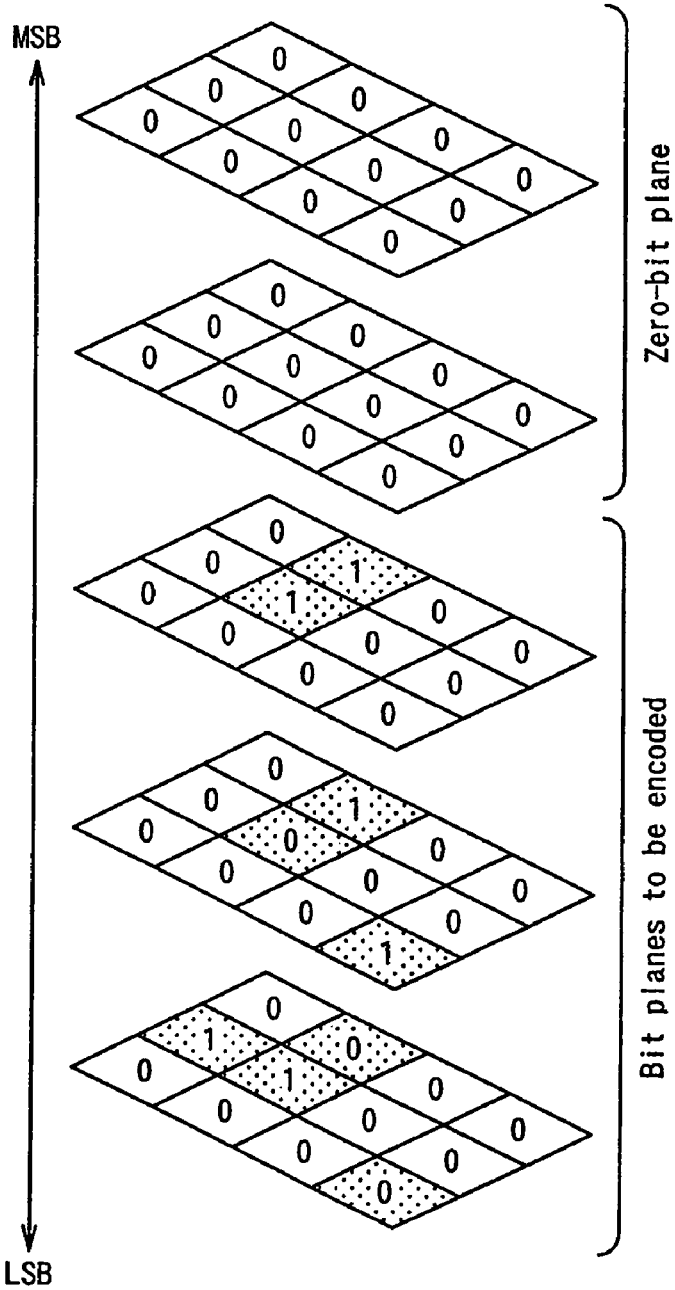

A quantizer 102 quantizes the wavelet coefficient for each sub-band, generating a quantization coefficient. A code-block generating device 103 divides the quantization coefficient for each sub-band to code blocks that are rectangular regions of the same size. Then, the device 103 expands the quantization coefficient for each sub-band into a bit plane that is a set of coefficient bits (each being 0 or 1). For example, a code block shown in FIG. 3A, which consists of 16 quantization coefficients arranged in four rows and four columns, is expanded into a sign-bit plane and absolute-value bit planes, as is illustrated in FIG. 3B. A zero-bit-plane number detector 104 detects zero-bit planes for each code block. The zero-bit-plane number shows how many zero-bit planes which exist on the side of the most significant bit (MSB) and in which all coefficient bits are 0s. In the case of FIG. 3B, there are two zero-bit planes. A zero-bit-plane deleting device 105 deletes the zero-bit planes from the code block.

A bit-modeling device 106 perform bit modeling on any code block that contains no zero-bit planes and generates a set of MQ symbols and a set of MQ contexts. An MQ encoder 107 encodes the set of MQ symbols and the set of MQ contexts and generates an MQ code. Finally, a code-stream generator 108 generates and outputs a code stream that is composed of the MQ code and the zero-bit-plane number.

Figure 4:
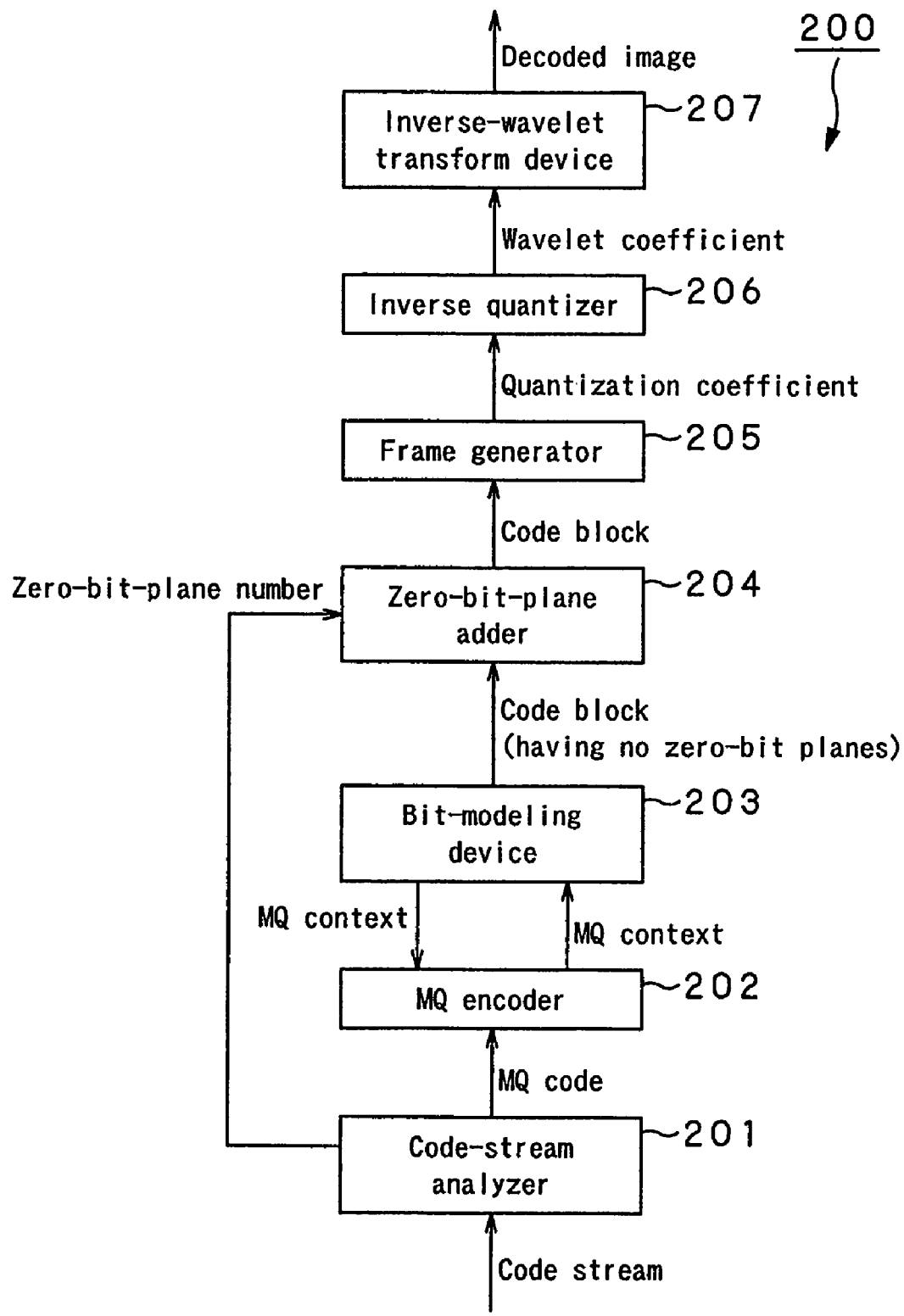
FIG. 4 is a block diagram showing the schematic configuration of an image-decoding apparatus that decodes a code stream in accordance with the JPEG 2000 scheme and generates a decoded image.

FIG. 4 is a block diagram showing the schematic configuration of an image-decoding apparatus that decodes a code stream in accordance with the JPEG 2000 scheme and generates a decoded image.

In the image-decoding apparatus 200 of FIG. 4, a code-stream analyzer 201 analyzes an input code stream and extracts the MQ code and the zero-bit-plane number from the code stream. An MQ decoder 202 decodes the MQ code, using the MQ context supplied from a bit-modeling device 203, and generates an MQ symbol.

The bit-modeling device 203 generates, on the basis of the MQ symbol, a code block that contains no zero-bit planes. A zero-bit-plane adder 204 adds zero-bit planes to the code block that contains no zero-bit planes. A frame generator 205 compiles, for each sub-band, code blocks each including zero-bit planes, and generates a quantization coefficient for the sub-band. An inverse quantizer 206 performs inverse quantization on the quantization coefficient for each sub-band, thus generating a wavelet coefficient for the sub-band. Finally, an inverse-wavelet transform device 207 performs inverse-wavelet transform on the wavelet coefficient for each sub-band and generates a decoded image.

First Embodiment

Figure 5:
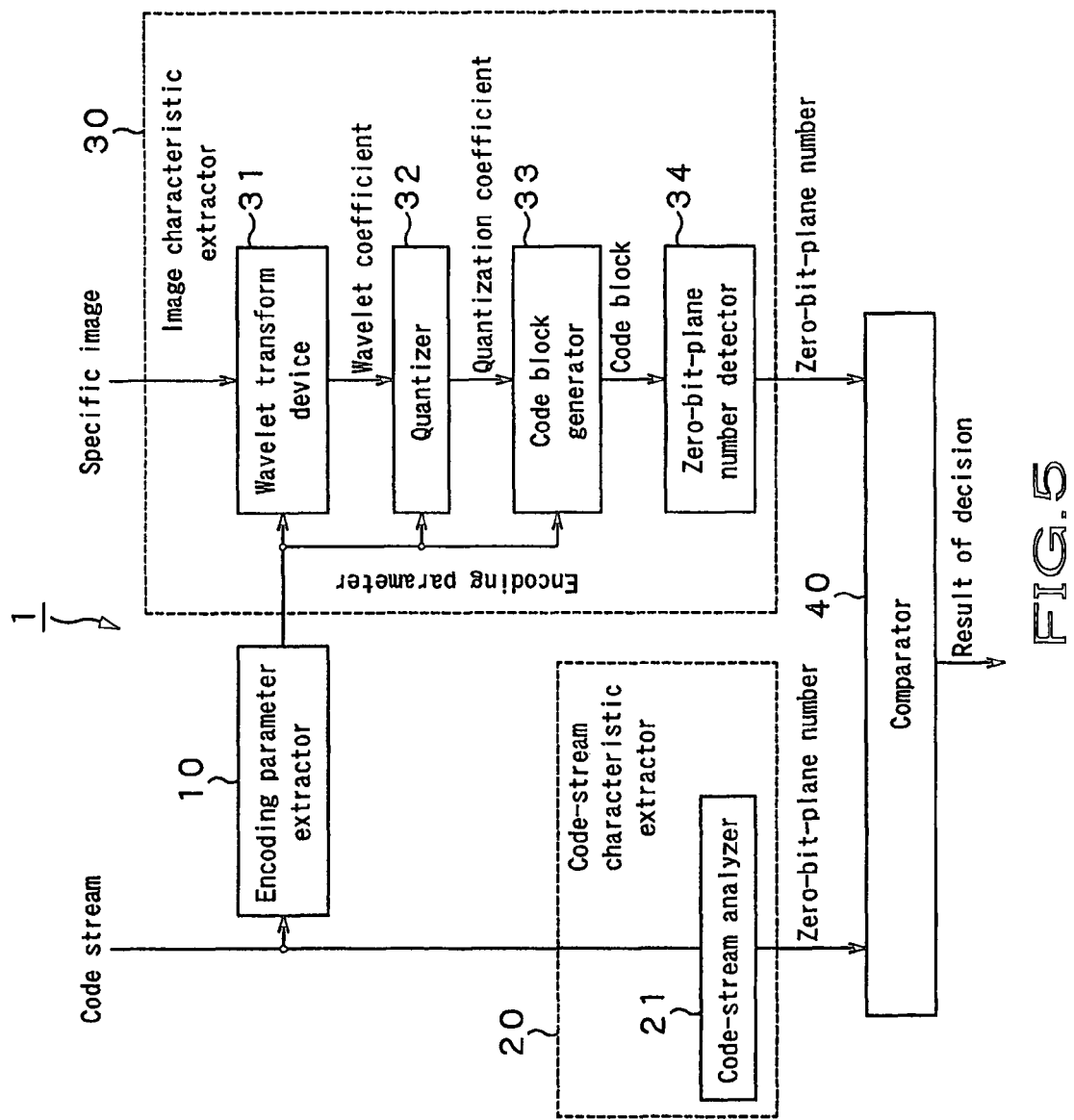
FIG. 5 is a block diagram showing the schematic configuration of an image-comparing apparatus according to a first embodiment of this invention.

FIG. 5 illustrates the schematic configuration of an image-comparing apparatus according to a first embodiment of this invention. The image-comparing apparatus 1 compares a code stream input to one input terminal with a specific image input to the other input terminal and determines whether the code stream is identical to the specific image.

In the image-comparing apparatus 1, a code stream is input to an encoding parameter extractor 10 and a code-stream characteristic amount extractor 20. A specific image is input to an image characteristic amount extractor 30.

The encoding parameter extractor 10 extracts the encoding parameter of the code stream and supplies the encoding parameter to a wavelet transform device 31, a quantizer 32, and a code block generator 33 in the image-characteristic amount extractor 30. The encoding parameter shows how the quantization coefficient for each code block is generated. Its wavelet transform part may indicate the type of the filter used (reversible 5-3 filter, non-reversible 9-7 filter, or the like) or the number of times the wavelet transform is repeated (5 times, 4 times, or the like). Its quantization part may indicate the size of the quantization step ($\frac{1}{128}$, $\frac{1}{64}$, or the like). Its code-block part may indicate the size of the code block (64 (vertical)×64 (horizontal), 32 (vertical)×128 (horizontal), 32 (vertical)×32 (horizontal), or the like).

The code-stream characteristic amount extractor 20 has a code-stream analyzer 21. The code-stream analyzer 21 analyzes an input code stream and extracts the zero-bit-plane number for each code block.

The image characteristic amount extractor 30 has a wavelet transform device 31, a quantizer 32, a code block generator 33 and a zero-bit-plane number detector 34. The image characteristic amount extractor 30 extracts the zero-bit-plane number for each code block, on the basis of the encoding parameter of the code stream. More specifically, the wavelet transform device 31 performs wavelet transform on the specific image, generating the wavelet coefficient for each sub-band, and the quantizer 32 quantizes the wavelet coefficient for each sub-band, generating a quantization coefficient. The code block generator 33 divides the quantization coefficient of each sub-band into code blocks, and expands the quantization coefficient of each code block into a bit plane. The zero-bit-plane number detector 34 detects the zero-bit-plane number of each code block.

A comparator 40 compares the zero-bit-plane number supplied from the code-stream analyzer 21 with the zero-bit-plane number supplied from the zero-bit-plane number detector 34, determining whether the code stream is identical to the specific image. The comparator 40 outputs the result of decision.

Figure 6:
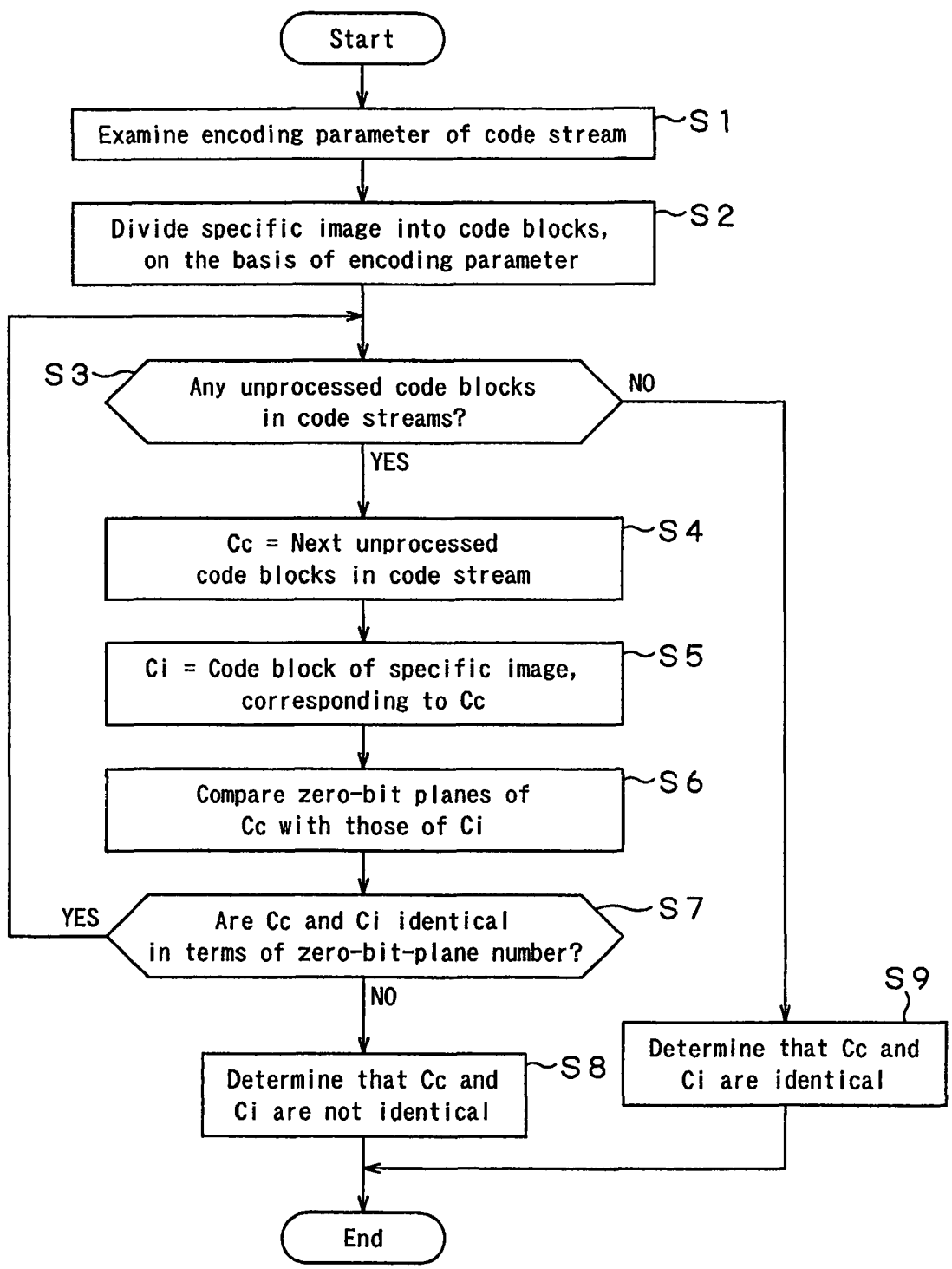
FIG. 6 is a flowchart explaining the process performed by the image-comparing apparatus of FIG. 5.

The process performed by the image-comparing apparatus 1, including the comparison carried out in the comparator 40, will be explained with reference to the flowchart of FIG. 6. First, the encoding parameter of the code stream is extracted in Step S1. In Step S2, wavelet transform and quantization are performed on the specific image, on the basis of the encoding parameter. The specific image is thereby divided into code blocks.

Next, in Step S3, it is determined whether the code stream contains an unprocessed code block. If the code stream contains an unprocessed code block, the next unprocessed code block Cc in the code stream is set in Step S4. The code block Ci of the specific image which corresponds to the code block Cc is set in Step S5. In Step S6, the zero-bit-plane number of the code block Cc is compared with the zero-bit-plane number of the code block Ci. In Step S7, it is determined whether these zero-bit-plane numbers are equal or not. If the zero-bit-plane numbers are not identical, it is determined in Step S8 that the code stream is not identical to the specific image. If the zero-bit-plane numbers are identical, the process returns to Step S3. If it is determined in Step S3 that the code stream does not contain unprocessed code blocks, the process goes to Step S9. In Step S9, it is determined that the code stream is identical to the specific image.

Figure 7:
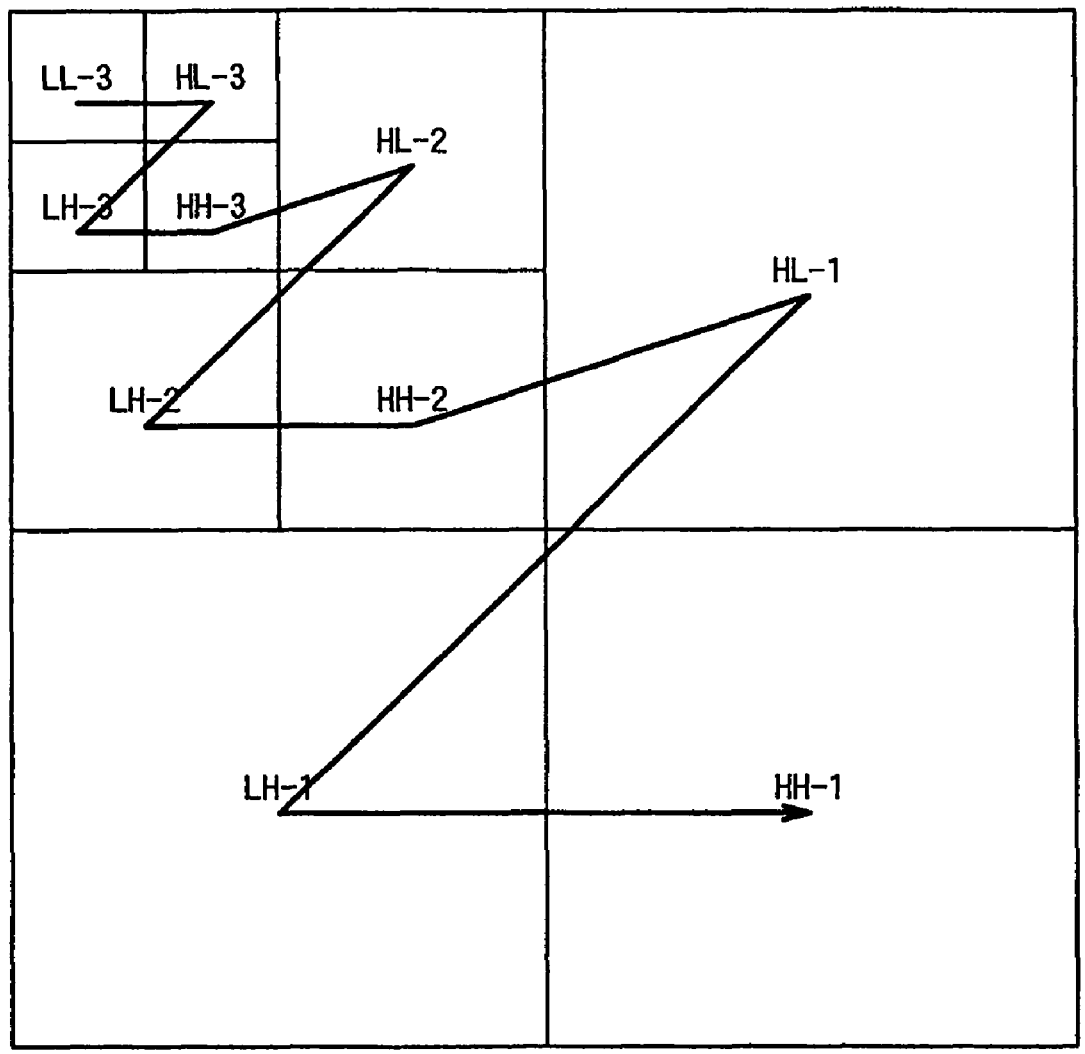
FIG. 7 is a diagram illustrating the order in which sub-bands are selected.

Unprocessed code blocks can be selected in any order desired. Nonetheless, the process will be simple if they are selected in the same order they are arranged in the code stream. In the code stream, unprocessed code blocks are arranged in ascending order of sub-bands, that is, the lowest sub-band toward the highest sub-band. For example, if the wavelet transform are repeated three times, the unprocessed code blocks are selected as shown in FIG. 7, starting with the lowest sub-band, i.e., LL-3, and proceeds at sub-bands HL-3, LH-3, HH-3, HL-2, LH-2, HH-2, HL-1, LH-1 and HH-1, one after another in the order mentioned. In each sub-band, unprocessed code blocks are selected in the order these blocks are raster-scanned. In the case of an ordinary image, the unprocessed code blocks are selected in ascending order of sub-bands, that is, the lowest sub-band toward the highest sub-band. Then, it can be determined whether the code stream is identical to the specific image, by repeating the loop only a few times. However, interlace components, i.e., characterizing features, appear in the sub-band LH-1 shown in FIG. 7. Hence, the unprocessed code blocks falling in this sub-band are selected in such an order that they may be processed faster. In this case, whether the code stream is identical to the specific image can be determined by repeating the loop only a few times.

As described above, the image-comparing apparatus 1 can determine whether an input code stream is identical to a specific image, first by comparing the code stream with the specific image in terms of the zero-bit-plane number for the code block at the same position, and then by determining whether all code blocks of the code stream are identical to with those of the specific image in terms of zero-bit-plane number. Particularly, zero-bit-plane numbers only need to be extracted from the code stream and need not be decoded completely. The image-comparing apparatus 1 is therefore advantageous in that processes such as MQ decoding, bit-modeling, inverse quantization and inverse wavelet transform need not be carried out. Thus, MQ codes need not be decoded in order to extract the zero-bit-plane numbers from the code stream. The apparatus 1 is therefore very advantageous, too, in view of the simplicity and speed of the process.

In the method according to this embodiment, any decision that the code stream is not identical to the specified image is never incorrect. On the other hand, any decision that the code stream is identical to the specific image may be incorrect. Nevertheless, the results of the experiments conducted show that this decision is scarcely incorrect. The experiments conducted on code streams compressed at 1 bpp (bit per pixel), i.e., the compression ratio that is applied usually, revealed no decision errors. Even for code streams compressed at 0.1 bpp, each representing a 300-frame image, decision errors occurred for four frames only.

As indicated above, all code blocks are compared in terms of zero-bit-plane number. Nonetheless, all code blocks need not be so compared. If some of the code blocks are not compared in terms of zero-bit-plane number, the change of making erroneous decision that the code stream is identical to the specific image, though the code stream is actually not identical, will increase indeed. However, if the decision accuracy is high enough in view of the conditions in which the apparatus 1 is used, the process will be simpler and carried out faster. In fact, as the experiments show, no problems will arise in most cases even if only the low-band components or only high sub-bands are removed. This is because the code blocks found not identical to the specific image are those in the low-band luminance components.

Second Embodiment

Figure 8:
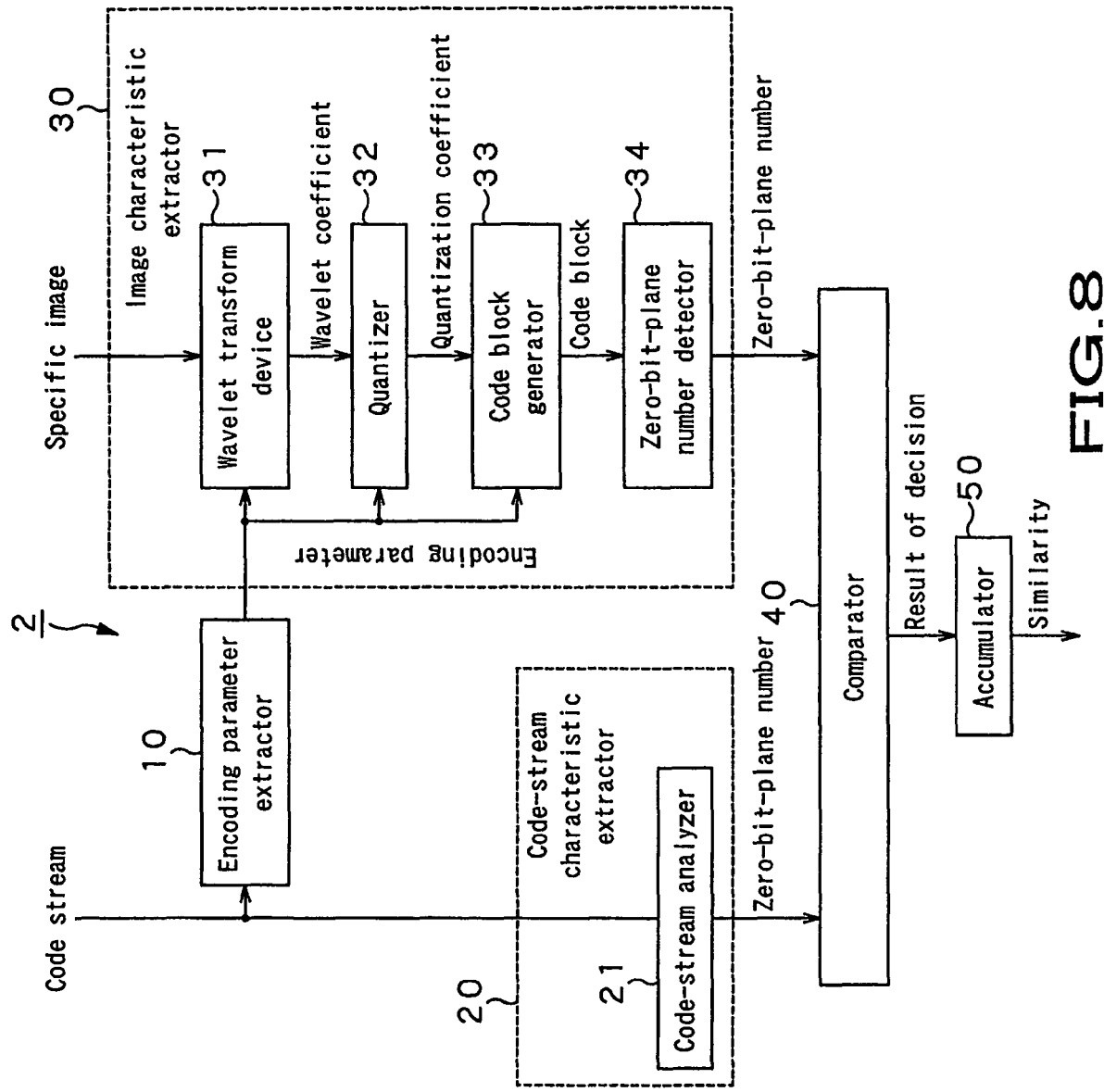
FIG. 8 is a block diagram showing the schematic configuration of an image-comparing apparatus according to a second embodiment of the invention.

The schematic configuration of an image-comparing apparatus according to a second embodiment of this invention is shown in FIG. 8. The image-comparing apparatus 2 compares a code stream input to one input terminal with a specific image input to the other input terminal and determines how much the code stream is similar to the specific image. This image-comparing apparatus 2 is similar in basic structure to the image-comparing apparatus 1 shown in FIG. 5. It is characterized in that the results of decision supplied from the comparator 40 are accumulated in an accumulator 50 that the similarity of the code stream is calculated from the results of decision. The components similar to those of the image-comparing apparatus 1 shown in FIG. 5 are designated at the same reference numbers and will not be described in detail.

Figure 9:
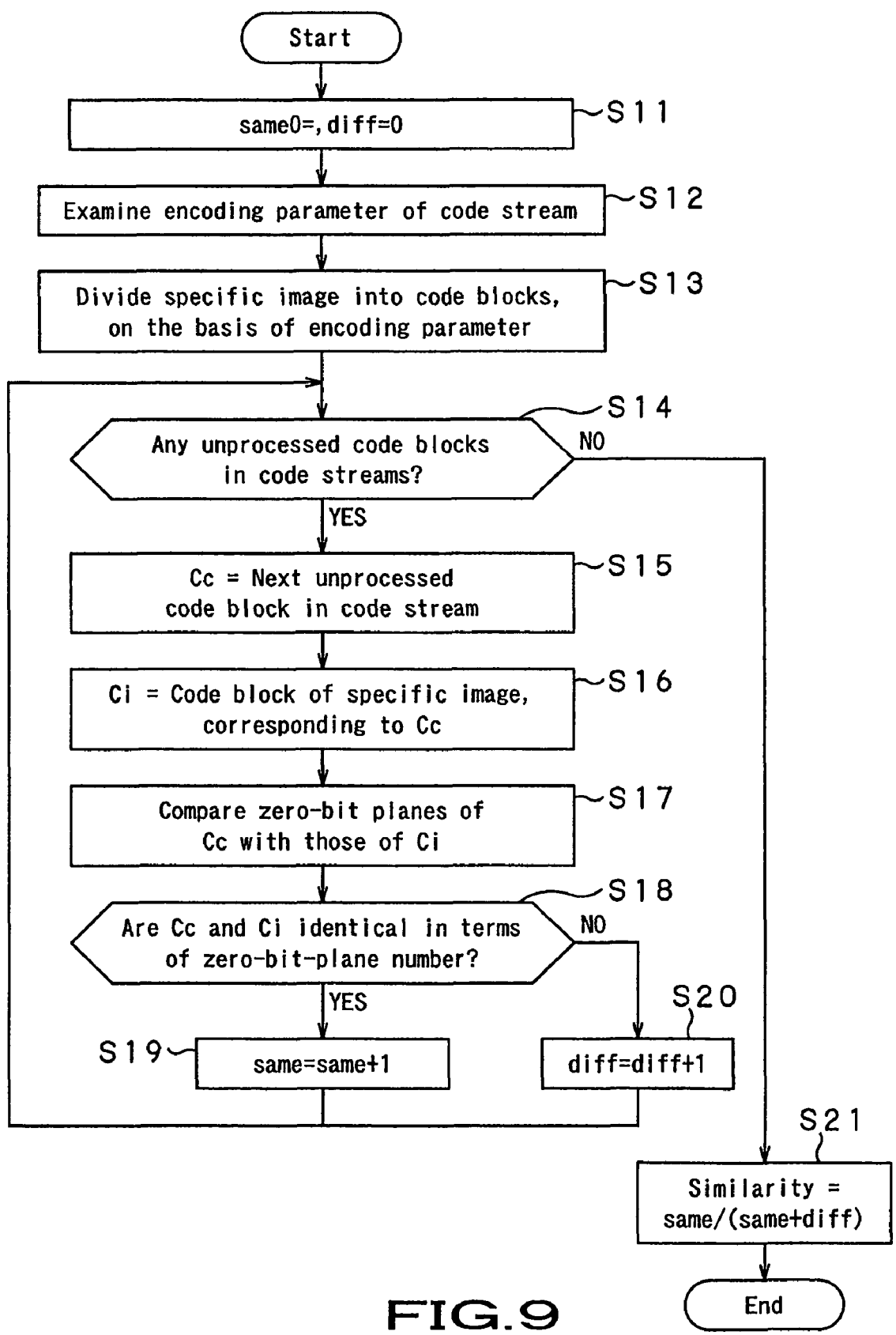
FIG. 9 is a flowchart explaining the process performed by the image-comparing apparatus of FIG. 8.

The process performed by the image-comparing apparatus 2 will be explained with reference to the flowchart of FIG. 9. First, the value of a variable same and the value of diff are initialized to 0 in Step S11. The variable same indicates similarity, and the variable diff indicates non-similarity.

In Steps S12 to S17, the code block Cc and the code block Ci are compared in terms of zero-bit-plane number. In Step S18, it is determined whether these zero-bit-plane numbers are equal or not. If the zero-bit-plane numbers are identical, the value of the variable same is increased by one in Step S19. If the zero-bit-plane numbers are not identical, the value of the variable diff is increased by one in Step S20. If it is determined in Step S14 that the code stream does not contain unprocessed code blocks, the process goes to Step S21. In Step S21, the value of same/(same+diff) is output as data showing the similarity between the code stream and the specific image.

Thus, in the image-comparing apparatus 2, two code blocks for a code stream and a specific image, respectively, are compared in terms of zero-bit-plane number. The results of comparison for all code blocks are accumulated. The similarity between the code stream and the specific image can be therefore determined. In this case, too, the zero-bit-plane numbers need not be completely decoded. Hence, the apparatus 2 is very advantageous in view of the simplicity and speed of the process.

As described above, the value of the variable is increased by one if the zero-bit-plane numbers are identical or different. In practice, the variable may be weighted. If this is the case, it is desirable to weight that part of the variable which seems to characterize the image. Most images are characterized by their low-band parts. It is therefore desired that the variable be weighted so that the comparison result for a low-band code block may be predominant. Further, the comparison result about the luminance components are preferably weighted to be predominant over the comparison result for the color components.

If the zero-bit-plane numbers are different, the absolute value of the difference (or the exponential value thereof) may be accumulated as well.

As pointed out above, the similarity between a code stream and a specific image is determined. Nonetheless, the similarity may be compared with a threshold value at the last step of the process, to determine whether the code stream is identical to the specific image. Whether the code stream is identical to the specific image can of course be determined prior to the last step of the process, if the variables same and diff deviate from each other.

Third Embodiment

Figure 10:
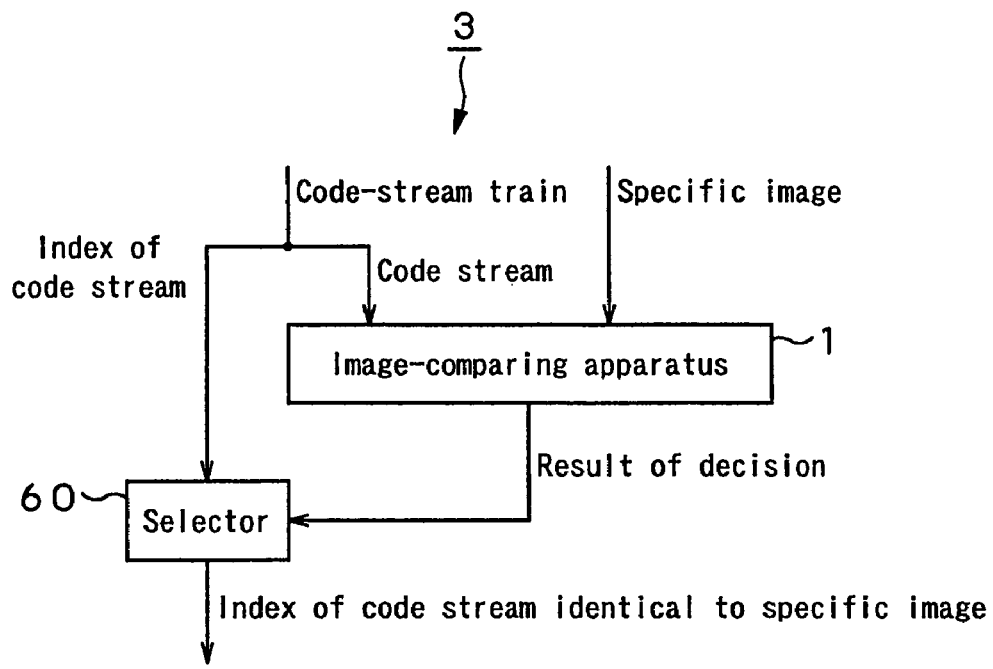
FIG. 10 is a block diagram showing the schematic configuration of an image-retrieving apparatus according to a third embodiment of the present invention.

The schematic configuration of an image-retrieving apparatus according to a third embodiment of this invention is shown in FIG. 10. The image-retrieving apparatus 3 retrieves a code stream identical to a specific image input to one terminal, from code-stream train (a set of code streams obtained by encoding images) that is video contents input to the other input terminal.

In the image-retrieving apparatus 3, the code-stream train consists of code streams and the indexes thereof. The code streams are input to an image-comparing apparatus 1, and the indexes are input to a selector 60. Meanwhile, a specific image is input to the image-comparing apparatus 1.

The image-comparing apparatus 1 is of the same type as the first embodiment. It compares each code stream with the specific image and supplies the result of comparison to the selector 60. The selector 60 outputs the index of any code stream that has been determined to be identical to the specific image.

Figure 11:
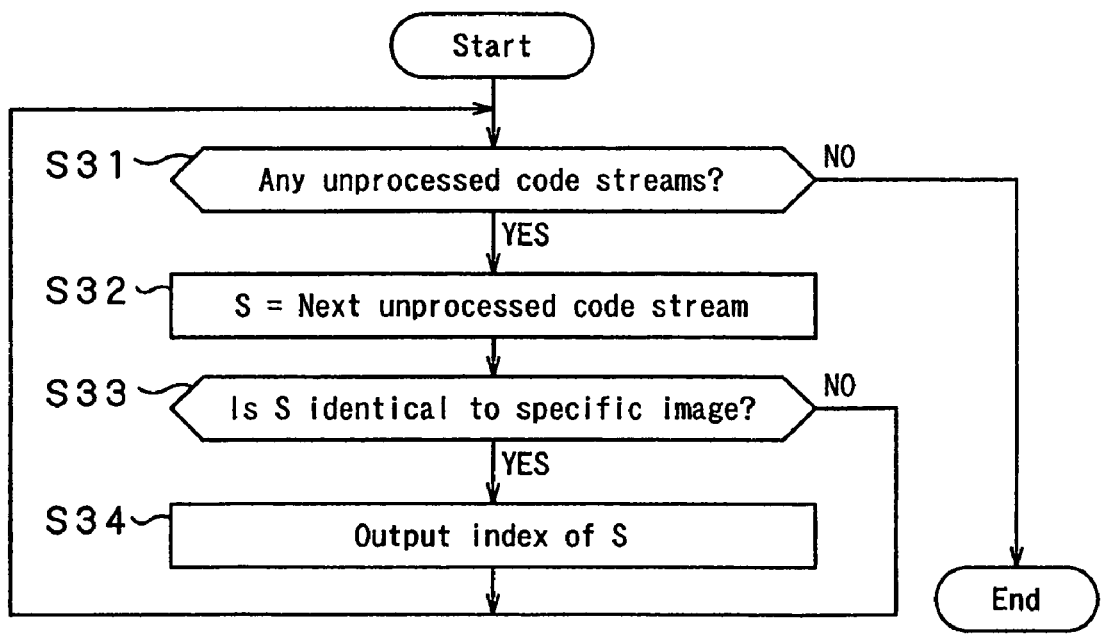
FIG. 11 is a flowchart explaining the process performed by the image-retrieving apparatus of FIG. 10.

The process that the image-retrieving apparatus 3 performs will be explained with reference to the flowchart of FIG. 11. First, it is determined, in Step S31, whether any code streams have not been processed. If there are any code streams not processed yet, the next unprocessed code stream S is set in Step S32. In Step S33, it is determined whether the code stream S is identical to the specific image. If the code stream S is found not identical, the process returns to Step S31. If the code stream S is found identical, the process goes to Step S34. In Step S34, the index of the code stream is output. Then, the process returns to Step S31. If no unprocessed code streams are found in Step S31, the process is terminated.

Thus, the process that the image-retrieving apparatus 3 performs according to this embodiment can retrieve a code stream identical to the specific image, from the code-stream train, and can output the index of the code stream retrieved. Particularly, the apparatus uses the image-comparing apparatus 1 that is of the same type as the first embodiment, only extracts a zero-bit-plane number from each code stream and need not decode the number completely in determining whether each code stream is identical to the specific image. The apparatus 3 is therefore advantageous in that processes such as MQ decoding, bit-modeling, inverse quantization and inverse wavelet transform need not be carried out. Further, since the encoding parameter does not change for any code-stream train, the wavelet transform device 31, quantizer 32, code block generator 33 and zero-bit-plane number extractor 34, all provided in the image-comparing apparatus 1, need not be operated for every code stream. Hence, the apparatus 3 can retrieve a code stream by processing a small amount of data.

As indicated above, the image-comparing apparatus 1 used is of the same type as the first embodiment. Nonetheless, an image-comparing apparatus 2 of the type as the second embodiment may be utilized. In this case, the selector 60 can output, for example, the indexes of code streams that have similarity exceeding a preset threshold value.

Fourth Embodiment

Figure 12:
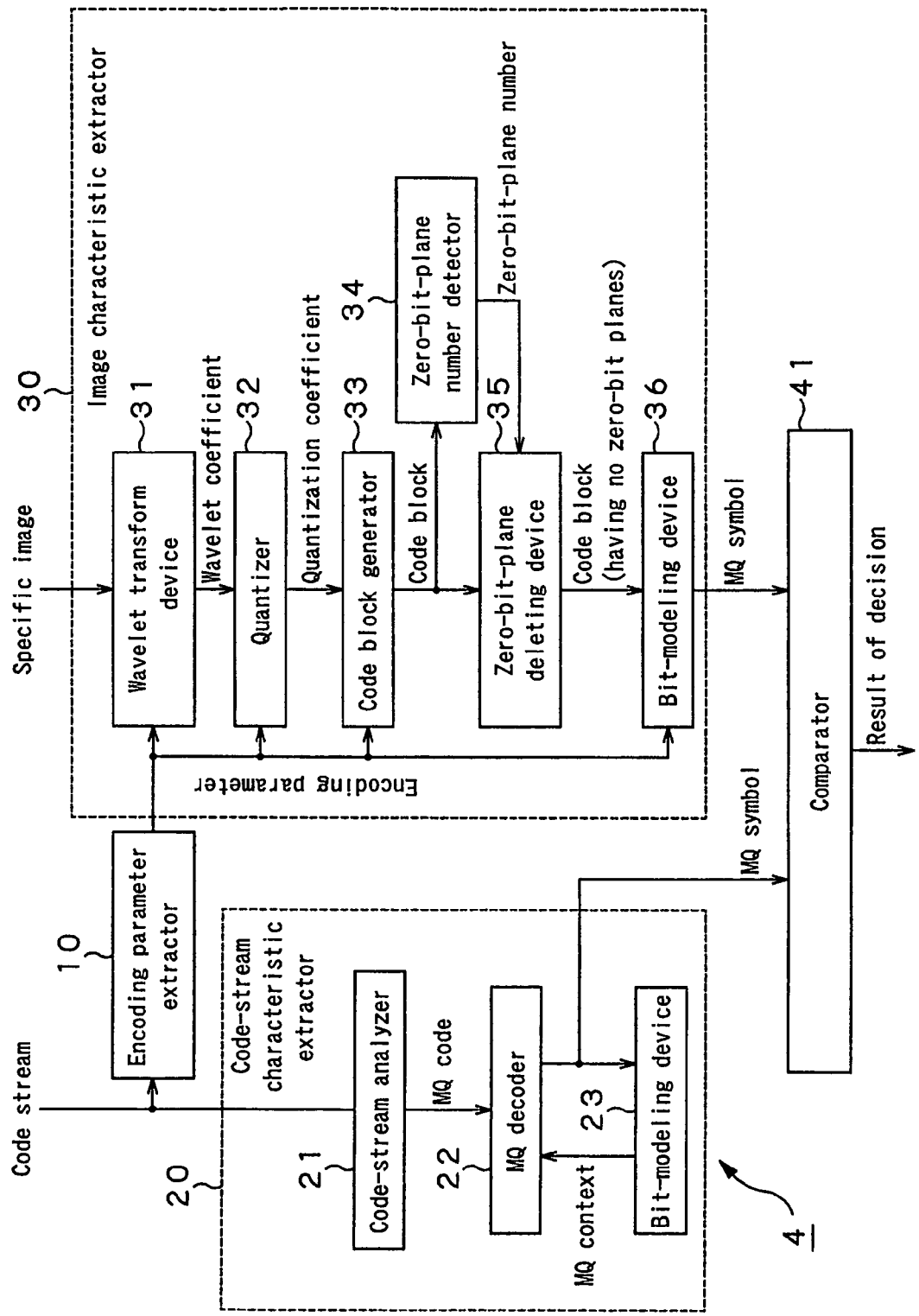
FIG. 12 is a block diagram showing the schematic configuration of an image-comparing apparatus according to a fourth embodiment of this invention.

The schematic configuration of an image-comparing apparatus according to a fourth embodiment of the present invention is shown in FIG. 12. The image-comparing apparatus 4 compares a code stream input to one input terminal with a specific image input to the other input terminal and determines how much the code stream is similar to the specific image. This image-comparing apparatus 4 is similar in basic structure to the image-comparing apparatus 1 shown in FIG. 5. However, the apparatus 6 is characterized in that it compares MQ symbols, not zero-bit-plane numbers. The components similar to those of the image-comparing apparatus 1 shown in FIG. 5 are designated at the same reference numbers and will not be described in detail.

The code-stream characteristic amount extractor 20 has a code-stream analyzer 21, an MQ decoder 22 and a bit-modeling device 23 and extracts an MQ symbol from each code stream. More specifically, the code-stream analyzer 21 analyzes an input code stream and extracts an MQ code. The MQ decoder 22 decodes the MQ code by using the MQ context supplied from the bit-modeling device 23, thus generating an MQ symbol. The MQ symbol is supplied to a comparator 41.

The image characteristic amount extractor 30 has a zero-bit-plane number deleting device 35 and a bit-modeling device 36 in addition to the components of its counterpart used in the first embodiment. The extractor 30 detects an MQ symbol for the specific image, on the basis of the encoding parameter of the code stream. More specifically, the zero-bit-plane number deleting device 35 deletes zero-bit planes from each code block. The bit-modeling device 36 performs bit modeling on any code block that has no zero-bit planes, generating an MQ symbol. The MQ symbol thus generated is supplied to the comparator 41.

The comparator 41 compares the MQ symbol supplied from the MQ decoder 22 with the MQ symbol supplied from the bit-modeling device 36. The comparator 41 thus determines whether the code stream is identical to the specific image. The comparator 41 outputs the result of decision.

Figure 13:
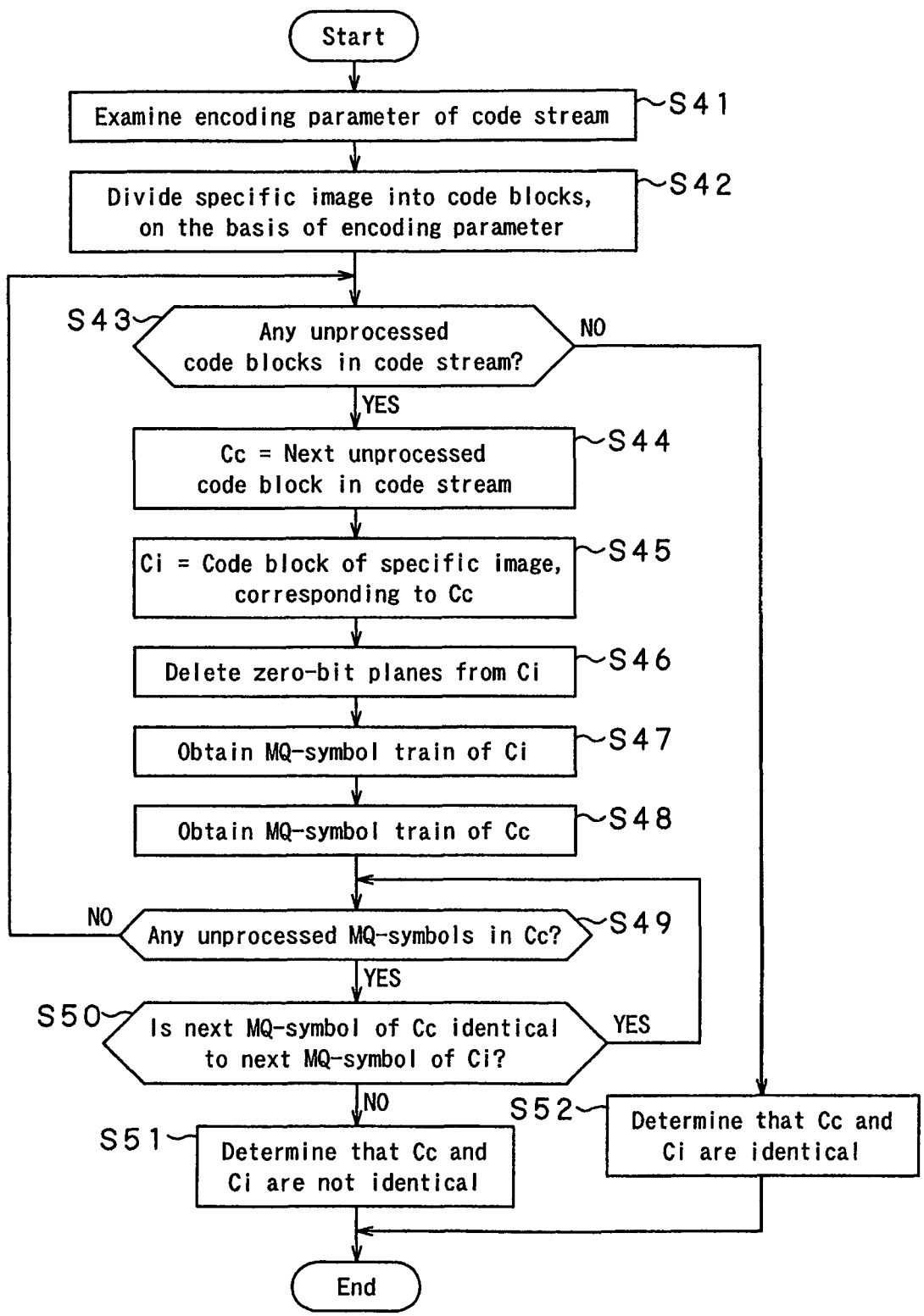
FIG. 13 is a flowchart explaining the process performed by the image-comparing apparatus of FIG. 12.

The process performed by the image-comparing apparatus 4, including the comparison carried out in the comparator 41, will be explained with reference to the flowchart of FIG. 13.

First, the encoding parameter of the code stream is extracted in Step S41. In Step S42, wavelet transform and quantization are performed on the specific image, on the basis of the encoding parameter. The specific image is thereby divided into code blocks.

Next, in Step S43, it is determined whether the code stream contains an unprocessed code block. If the code stream contains an unprocessed code block, the next unprocessed code block Cc in the code stream is set in Step S44. The code block Ci of the specific image which corresponds to the code block Cc is set in Step S45. In Step S46, the zero-bit-plane number of the code block Ci is detected and the zero-bit planes are deleted from the code block Ci. In Step S47, bit-modeling is performed on the code block Ci, thereby obtaining an MQ-symbol train. In Step S48, MQ decoding and bit-modeling are performed on the code block Cc, thereby obtaining an MQ-symbol train.

In Step S49, it is determined whether any unprocessed MQ symbols exist in the code block Cc. If no unprocessed MQ symbols exist, the process returns to Step S43. If unprocessed MQ symbols exist, the process goes to Step S50. In Step S50, it is determined whether the next MQ symbol of the code block Cc is identical to the next MQ symbol of the code block Ci. If the MQ symbols are not identical, the process goes to Step S51, in which it is determined that the code stream is not identical to the specific image. If the MQ symbols are identical, the process returns to Step S49.

If it is determined in Step S43 that the code stream contains no unprocessed code blocks, the process goes to Step S52. In Step S52, it is determined that the code stream is identical to the specific image.

In the image-comparing apparatus 4 according to the present embodiment, the MQ symbols of each code stream is compared with that of the specific image. Thus, whether the code stream is identical to the specific image can be determined in accordance with whether all MQ symbols are identical to that of the specific image. Particularly, the apparatus 4 is advantageous in that processes such as, inverse quantization and inverse wavelet transform need not be carried out because it only extracts an MQ symbol from each code stream and need not perform complete decoding.

As described above, all MQ symbols for the code stream are compared. Nevertheless, a specific number may be set for the MQ symbols that should be compared. The number of MQ symbols to compare may be reduced in accordance with the number of coding paths used.

Fifth Embodiment

Figure 14:
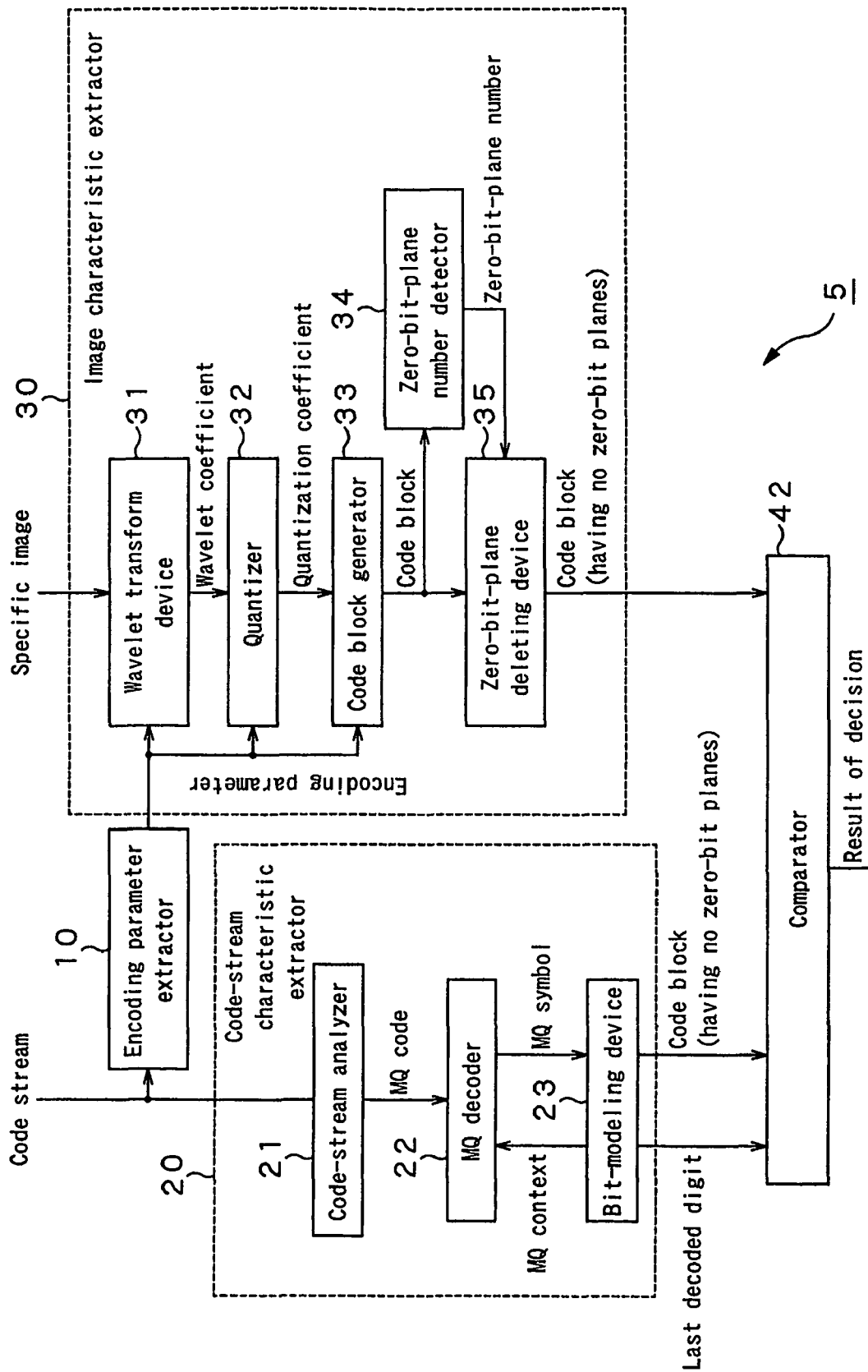
FIG. 14 is a block diagram showing the schematic configuration of an image-comparing apparatus according to a fifth embodiment of this invention.

The schematic configuration of an image-comparing apparatus according to a fifth embodiment of the present invention is shown in FIG. 14. The image-comparing apparatus 5 compares a code stream input to one input terminal with a specific image input to the other input terminal and determines how much the code stream is similar to the specific image. This image-comparing apparatus 5 is similar in basic structure to the image-comparing apparatus 4 shown in FIG. 12. However, the apparatus 5 is characterized in that it compares quantization coefficients, not zero-bit-plane numbers. The components similar to those of the image-comparing apparatus 4 shown in FIG. 12 are designated at the same reference numbers and will not be described in detail.

In the code-stream characteristic amount extractor 20, the MQ decoder 22 decodes the MQ code by using the MQ context supplied from the bit-modeling device 23, thus generating an MQ symbol. The bit-modeling device 23 generates a code block containing no zero-bit planes, on the basis of the MQ symbol. The code block containing no zero-bit planes is supplied to a comparator 42. The bit-modeling device 23 supplies information about the last digit to which the quantization coefficient has been decoded, to the comparator 42.

In the image characteristic amount extractor 30, a zero-bit-plane number deleting device 35 deletes zero-bit planes from each code block. The device 35 then supplies a code block containing no zero-bit planes, to the comparator 42.

The comparator 42 compares the quantization coefficient of the code block supplied from the bit-modeling device 23 and containing no zero-bit planes with that of the code block supplied from the zero-bit-plane number deleting device 35 and containing no zero-bit planes, on the basis of the information about the last decoded digit. Thus, the comparator 42 determines whether the code stream is identical to the specific image. The result of the decision is output from the comparator 42.

Figure 15:
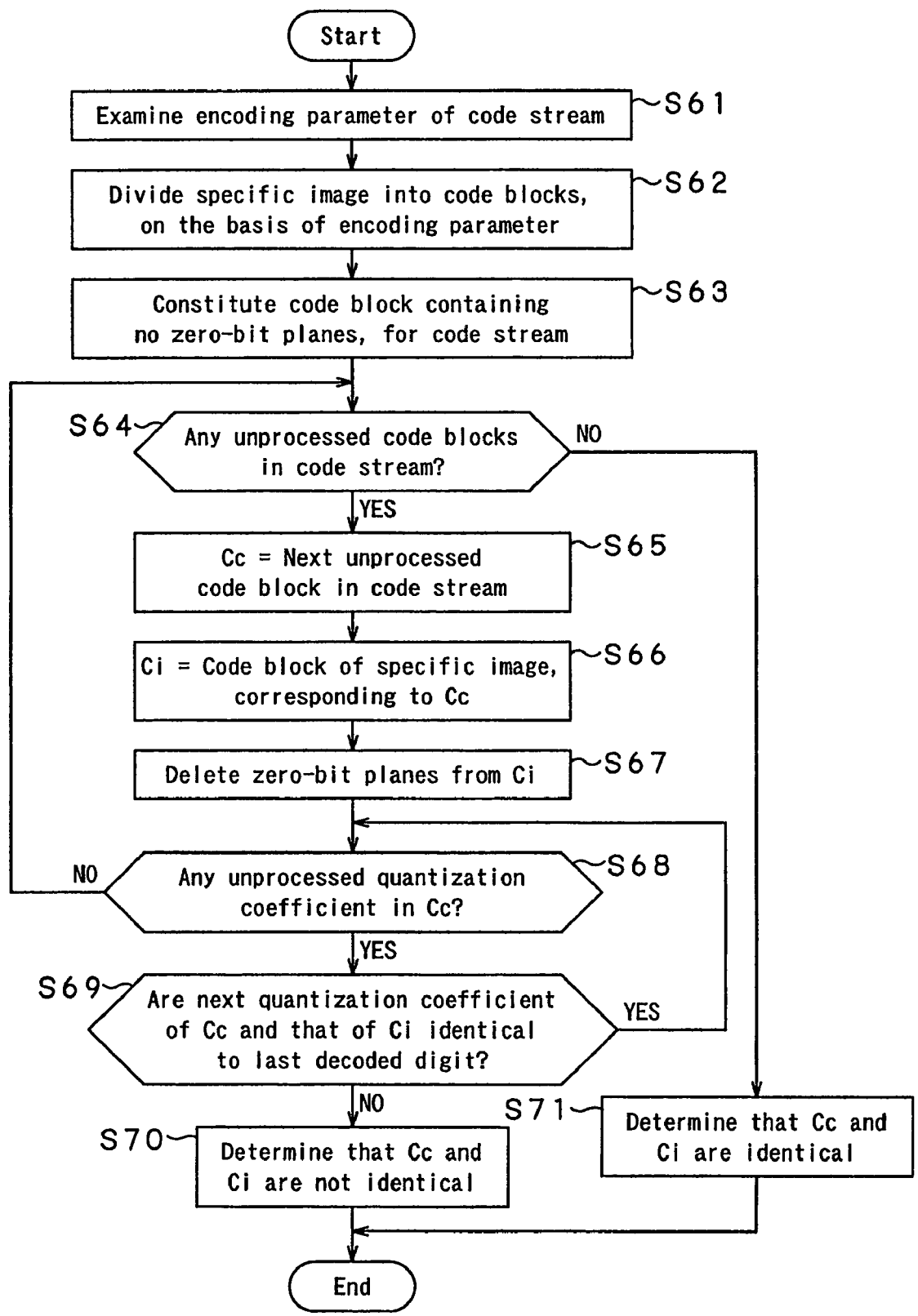
FIG. 15 is a flowchart explaining the process performed by the image-comparing apparatus of FIG. 14.

The process performed by the image-comparing apparatus 5, including the comparison carried out in the comparator 42, will be explained with reference to the flowchart of FIG. 15. First, the encoding parameter of the code stream is extracted in Step S61. In Step S62, wavelet transform and quantization are performed on the specific image, on the basis of the encoding parameter. The specific image is thereby divided into code blocks. In Step S63, a code block containing no zero-bit planes is constituted for the code stream.

Then, in Step S64, it is determined whether unprocessed code blocks exist in the code stream. If unprocessed code blocks exist, the next unprocessed code block Cc in the code stream is set in Step S65. The code block Ci of the specific image, which corresponds to the code block Cc, is set in Step S66. In Step S67, the zero-bit-plane number of the code block Ci is detected, and the zero-bit planes are deleted from the code block Ci.

Figure 16A:
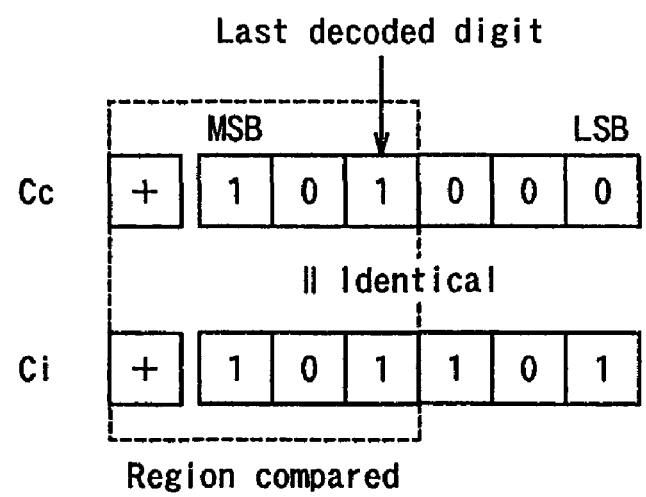
FIGS. 16A and 16B are diagrams explaining how quantization coefficients are compared to the last decoded digit.
Figure 16B:
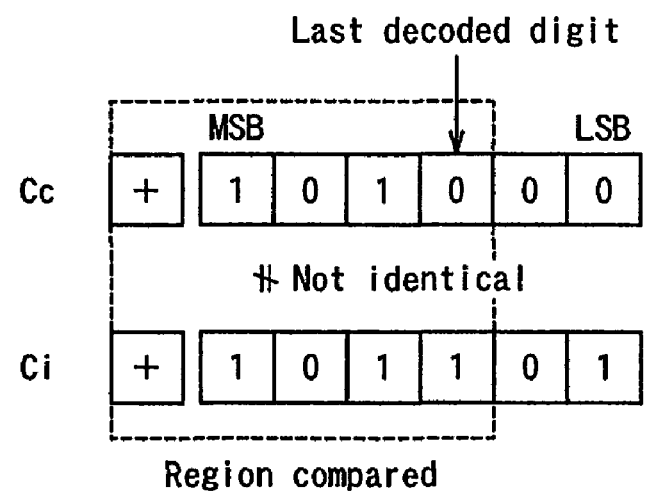

Next, it is determined in Step S68 whether the code block Cc contains unprocessed quantization coefficients. If the code block Cc contains no unprocessed quantization coefficients, the process returns to Step S64. If the code block Cc contains unprocessed quantization coefficients, the process goes to Step S69. In Step S69, it is determined whether the next quantization coefficient of the code block Cc and that of the code block Ci are identical to the last decoded digit. If these quantization coefficients are not identical to the last decoded digit, or are different even at any one digit, it is determined, in Step S70, that the code stream is not identical to the specific image. If the quantization coefficients are identical to the last decoded digit, the process returns to Step S68. To be more specific, the code stream is regarded as identical to the specific image if the quantization coefficients are identical, as shown in FIG. 16A, in terms of sign and the value of the most significant bit (MSB) and some bits following the MSB and including the last decoded bit. The code stream is not regarded as identical to the specific image if the quantization coefficients are not identical to the last decoded digit on the side of sign and MSB as shown in FIG. 16B, or are regarded different even at any one digit, they are regarded as not being identical.

If it is determined in Step S64 that no unprocessed code blocks exist in the code stream, the process goes to Step S71. In Step S71, it is determined that the code stream is identical to the specific image.

In the image-comparing apparatus 5 according to the present embodiment, a code stream is compared with a specific image, in terms of the quantization coefficients of each code block to the last decoded digit, thereby determine whether they are identical to the last encoded digit including the sign. In particular, the code stream is constituted by only code blocks, each containing no zero-bit planes, and, therefore, need not be decoded completely. Hence, the apparatus 5 is advantageous in that processes such as, inverse quantization and inverse wavelet transform need not be carried out.

As described above, the quantization coefficients are compared to the last decoded digit of the code stream. Nonetheless, if the bit-modeling is performed only to any digit preceding the last decoded digit, it suffices to compare the quantization coefficients up to that digit.

As indicated above, the quantization coefficients of code blocks that contain no zero-bit planes are compared. Instead, the quantization coefficients of code blocks containing zero-bit planes may be compared. In this case, the speed of the process may decrease a little, but the precision of determining whether the code stream is identical to the specific image increase.

Sixth Embodiment

Figure 17:
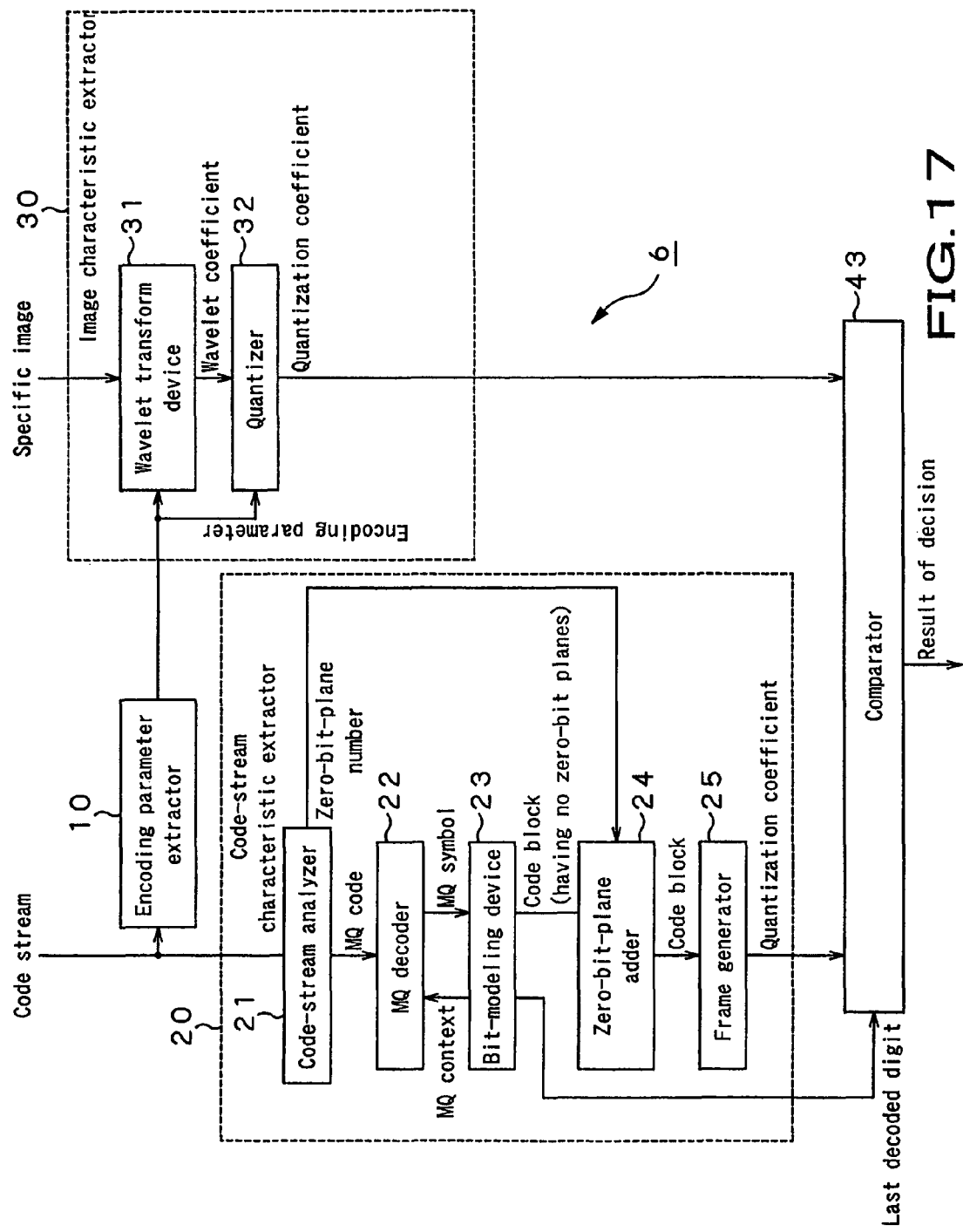
FIG. 17 is a block diagram showing the schematic configuration of an image-comparing apparatus according to a sixth embodiment of the present invention.

The schematic configuration of an image-comparing apparatus according to a sixth embodiment of this invention is shown in FIG. 17. This image-comparing apparatus 6 compares a code stream input to one input terminal with a specific image input to the other input terminal and determines how much the code stream is similar to the specific image. This image-comparing apparatus 6 is similar in basic structure to the image-comparing apparatus 5 shown in FIG. 14. The apparatus 6 is, nonetheless, characterized in that it compares quantization coefficients for sub-bands, not the quantization coefficients of the code blocks containing no zero-bit-plane numbers. Therefore, the components similar to those of the image-comparing apparatus 5 shown in FIG. 14 are designated at the same reference numbers and will not be described in detail.

In the code-stream characteristic amount extractor 20, a code-stream analyzer 21 analyzes the code stream, extracting an MQ code and a zero-bit-plane number. A zero-bit-plane adder 24 adds zero-bit planes to any code block that contains no zero-bit planes. A frame generator 25 compiles, for each sub-band, code blocks each including zero-bit planes, and generates a quantization coefficient for the sub-band. The quantization coefficient is supplied to a comparator 43.

In the image characteristic amount extractor 30, the quantizer 32 quantizes the wavelet coefficient for each sub-band, generating a quantization coefficient. The quantization coefficient is supplied to the comparator 43.

The comparator 43 compares the quantization coefficient of each sub-band, supplied from the frame generator 25, with the quantization coefficient of each sub-band, supplied from the quantizer 32, on the basis of the information about the last decoded digit. Thus, the comparator 43 determines whether the code stream is identical to the specific image and outputs the result of the decision.

Figure 18:
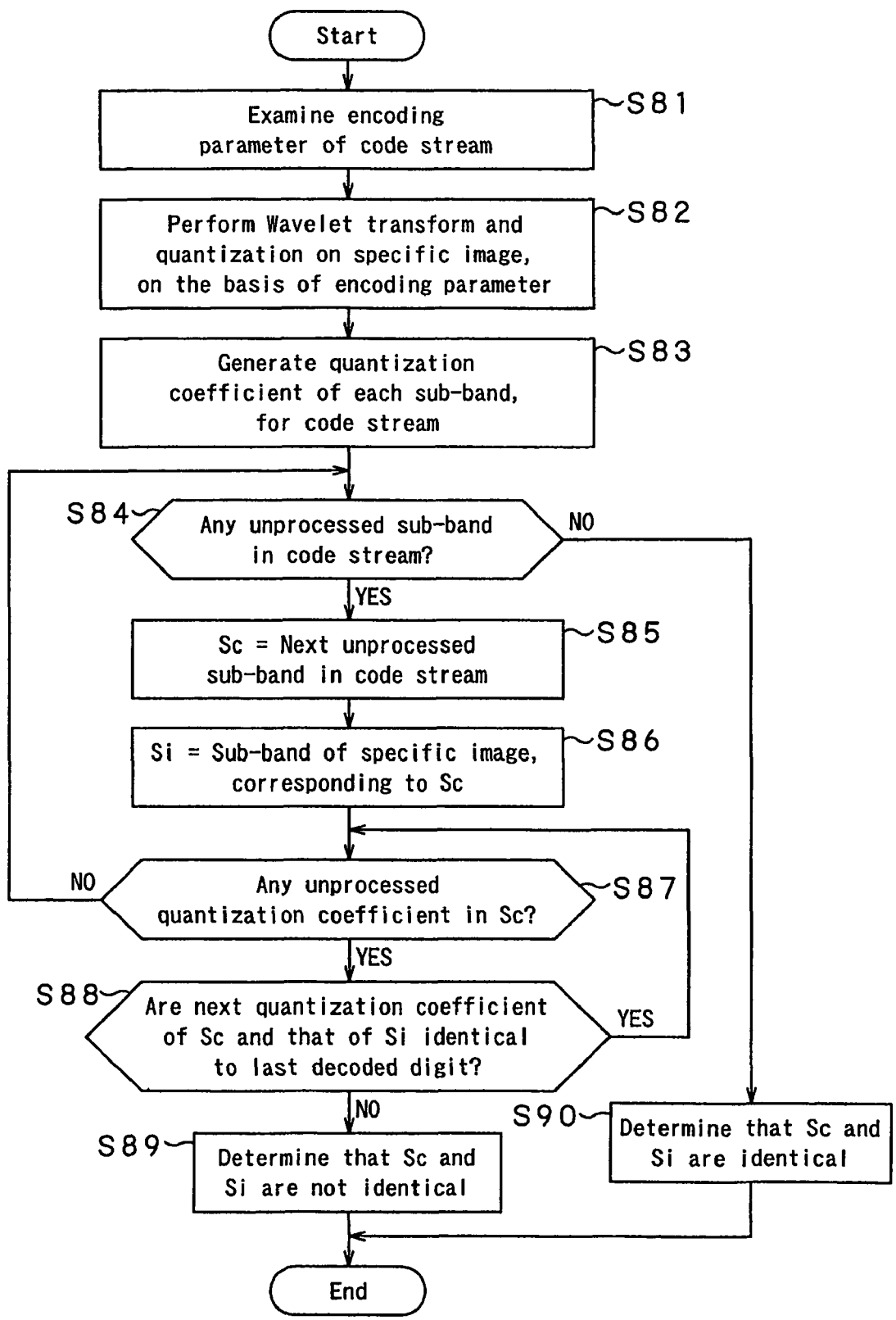
FIG. 18 is a flowchart explaining the process performed by the image-comparing apparatus of FIG. 17.

The process performed by the image-comparing apparatus 6, including the comparison carried out in the comparator 43, will be explained with reference to the flowchart of FIG. 18. First, the encoding parameter of the code stream is extracted in Step S81. In Step S82, wavelet transform and quantization are performed on the specific image, on the basis of the encoding parameter. In Step S83, a code block containing no zero-bit planes is constituted for the code stream. Zero-bit planes are added to the code block. Code blocks thus obtained, each including zero-bit planes, are compiled for each sub-band.

Then, in Step S84, it is determined whether unprocessed sub-bands exist in the code stream. If unprocessed sub-bands exist, the next unprocessed sub-band Sc in the code stream is set in Step S85. The sub-band Si of the specific image, which corresponds to the sub-band Sc, is set in Step S86.

In Step S87, it is determined whether the sub-band Sc contains unprocessed quantization coefficients. If the sub-band Sc contains no unprocessed quantization coefficients, the process returns to Step S84. If the sub-band Sc contains unprocessed quantization coefficients, the process goes to Step S88. In Step S88, it is determined whether the next quantization coefficient of the sub-band Sc and that of the sub-band Si are identical to the last decoded digit. If these quantization coefficients are not identical to the last decoded digit, or are different even at any one digit, it is determined, in Step S89, that the code stream is not identical to the specific image. If the quantization coefficients are identical to the last decoded digit, the process returns to Step S87.

If it is determined, in Step S84, that no unprocessed sub-bands exist in the code stream, the process goes to Step S90. In Step S90, it is determined that the code stream is identical to the specific image.

In the image-comparing apparatus 6 according to this embodiment, a code stream is compared with a specific image, in terms of the quantization coefficients of each sub-band to the last decoded digit. If all quantization coefficients of the sub-band are identical to those of the specific image, the code stream is regarded as identical to the specific image. In particular, the code stream is constituted by the quantization coefficients for every sub-band and, therefore, need not be decoded completely. Hence, the apparatus 6 is advantageous in that processes such as, inverse quantization and inverse wavelet transform need not be carried out.

Seventh Embodiment

Figure 19:
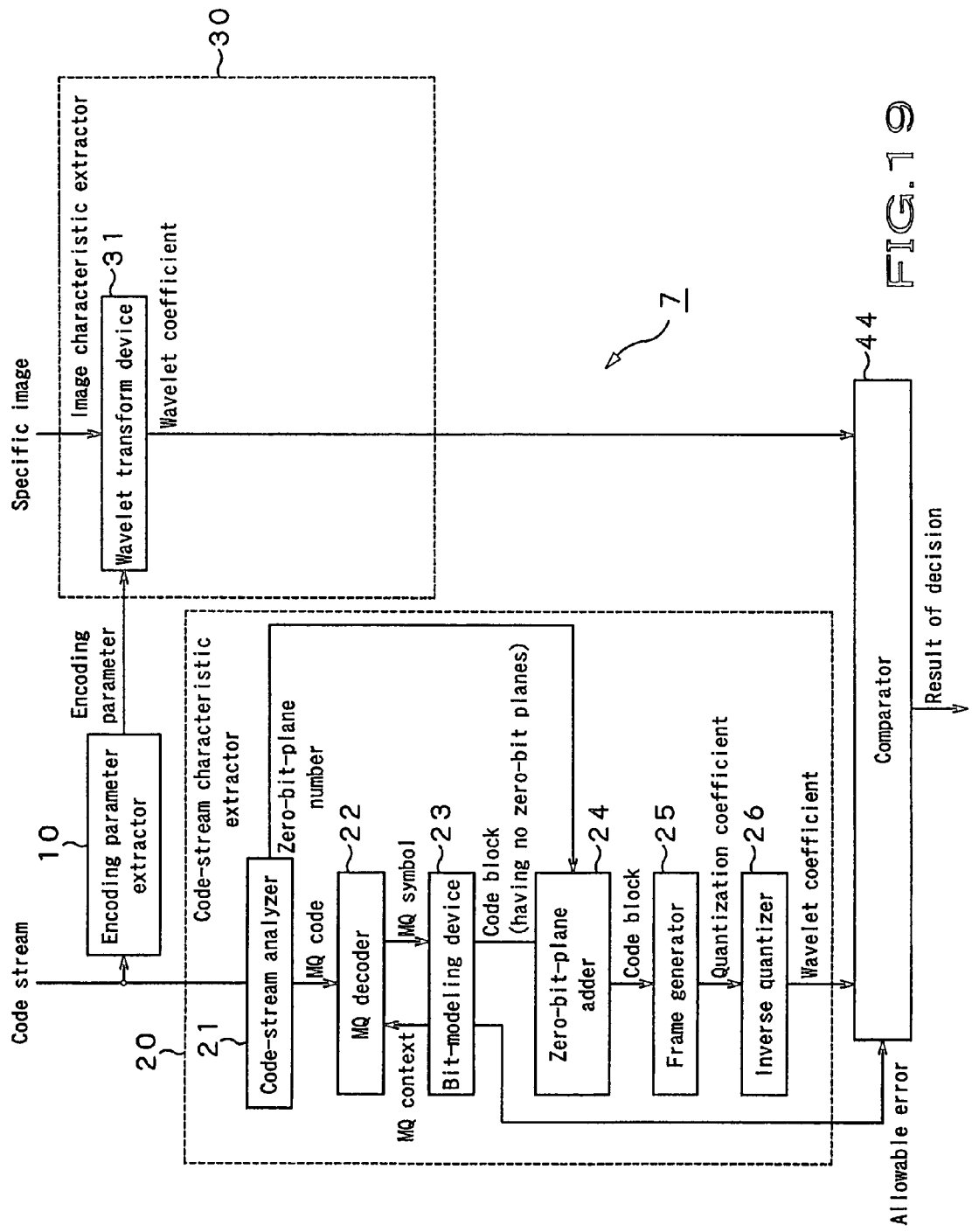
FIG. 19 is a block diagram showing the schematic configuration of an image-comparing apparatus according to a seventh embodiment of the invention.

The schematic configuration of an image-comparing apparatus according to a seventh embodiment of this invention is shown in FIG. 19. This image-comparing apparatus 7 compares a code stream input to one input terminal with a specific image input to the other input terminal and determines how much the code stream is similar to the specific image. This image-comparing apparatus 7 is similar in basic structure to the image-comparing apparatus 6 shown in FIG. 17. The apparatus 7 is, nonetheless, characterized in that it compares wavelet coefficients for sub-bands, not the quantization coefficients of the sub-bands. Therefore, the components similar to those of the image-comparing apparatus 6 shown in FIG. 17 are designated at the same reference numbers and will not be described in detail.

In the code-stream characteristic amount extractor 20, the bit-modeling device 23 generates a code block containing no zero-bit planes, on the basis of an MQ symbol. The bit-modeling device 23 generates information about an allowable error, which will be described later. This information is supplied to a comparator 44. An inverse quantizer 26 performs inverse quantization on the quantization coefficient for each sub-band and generates a wavelet coefficient for the sub-band. The inverse quantizer 26 supplies the wavelet coefficient to the comparator 44.

In the image characteristic amount extractor 30, a wavelet transform device 31 perform wavelet quantization on the specific image and generates a wavelet coefficient for each sub-band. The wavelet coefficient is supplied to the comparator 44.

The comparator 44 compares the wavelet coefficient for each sub-band, supplied from the inverse quantizer 26, with the wavelet coefficient for the sub-band, supplied from the wavelet transform device 31, on the basis of the information about the allowable error. The comparator 44 determines whether the code stream is identical to the specific image. The result of this decision is output.

Figure 20:
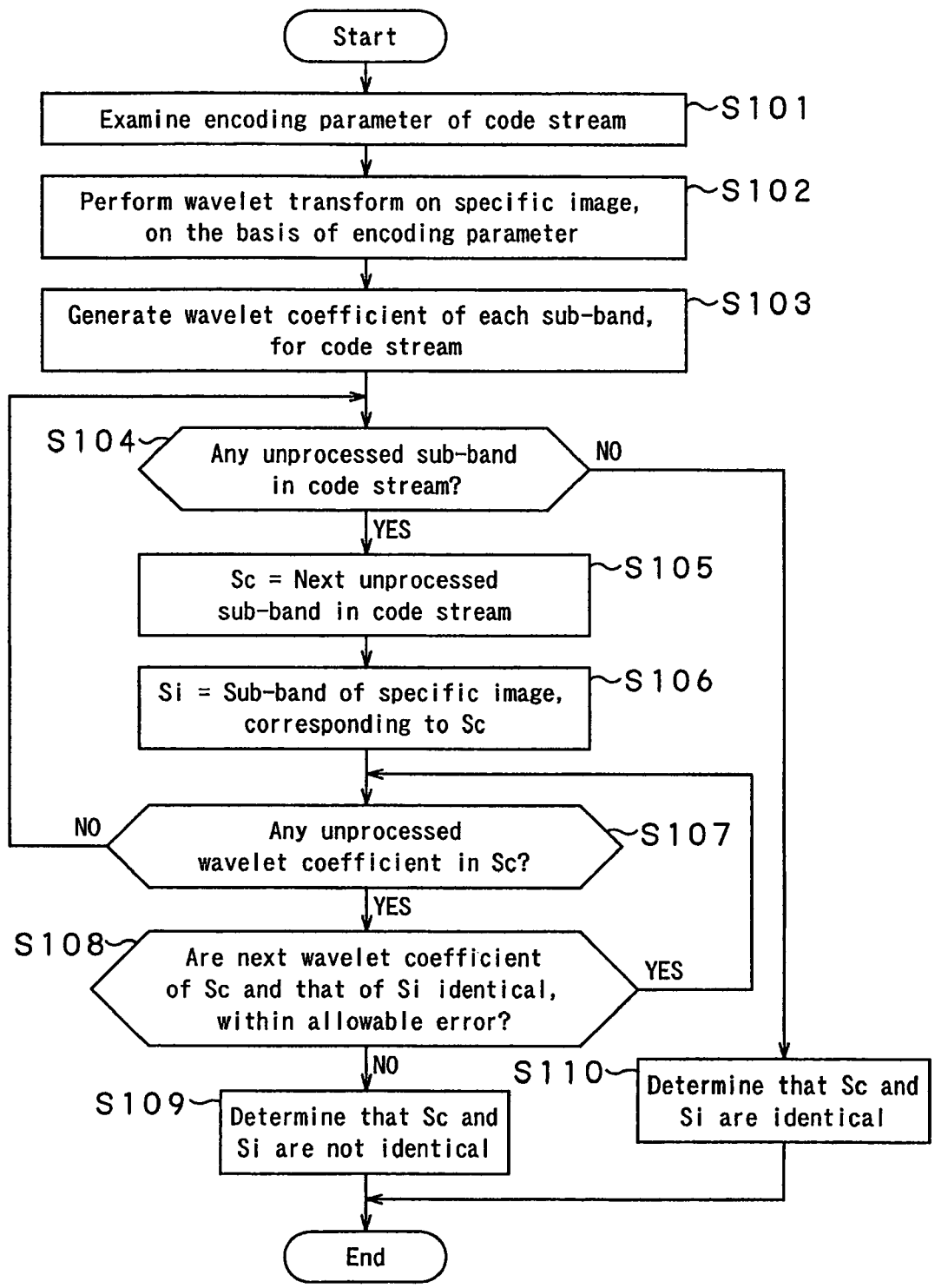
FIG. 20 is flowchart explaining the process performed by the image-comparing apparatus of FIG. 19.

The process performed by the image-comparing apparatus 7, including the comparison carried out in the comparator 44, will be explained with reference to the flowchart of FIG. 20. First, the encoding parameter of the code stream is extracted in Step S101. In Step S102, wavelet transform are performed on the specific image, on the basis of the encoding parameter. In Step S103, a quantization coefficient for each sub-band is generated for the code stream.

Then, in Step S104, it is determined whether unprocessed sub-bands exist in the code stream. If unprocessed sub-bands exist, the next unprocessed sub-band Sc in the code stream is set in Step S105. The sub-band Si of the specific image, which corresponds to the sub-band Sc, is set in Step S106.

In Step S107, it is determined whether the sub-band Sc contains unprocessed wavelet coefficients. If the sub-band Sc contains no unprocessed wavelet coefficients, the process returns to Step S104. If the sub-band Sc contains unprocessed wavelet coefficients, the process goes to Step S108. In Step S108, it is determined whether the next wavelet coefficient of the sub-band Sc and that of the sub-band Si are identical in the range of the allowable error. If these wavelet coefficients are not identical in the range of the allowable error, it is determined, in Step S109, that the code stream is not identical to the specific image. If the wavelet coefficients are identical in the range of the allowable error, the process returns to Step S107.

If it is determined, in Step S104, that no unprocessed sub-bands exist in the code stream, the process goes to Step S110. In Step S110, it is determined that the code stream is identical to the specific image.

In the image-comparing apparatus 7 according to the present embodiment, a code stream is compared with a specific image, in terms of the wavelet coefficients of each sub-band. If the wavelet coefficients of the sub-band are identical to those of the specific image in range of the allowable error, the code stream is regarded as identical to the specific image. In particular, the code stream is constituted by the wavelet coefficients for every sub-band and, therefore, need not be decoded completely. Thus, the apparatus 7 is advantageous in that processes such as inverse wavelet transform need not be carried out.

The best possible embodiments of this invention have been described. The invention is not limited to the embodiments, nevertheless. Various changes and modifications can of course be made, without departing from the scope and spirit of the present invention.

For example, the fourth to seventh embodiments, which are modifications of the invention, uses a characteristic amount different to the one utilized in the first embodiment, in order to determine whether a code stream is identical to a specific image. Further, a modification can be made, in which a characteristic amount different from the one used in the second embodiment is used, as in the fourth to seventh embodiments, to determine the similarity between the code stream and specific image. More specifically, if the characteristic amounts used in the second embodiment to determine similarity are wavelet coefficients, data items representing whether the wavelet coefficients are identical in range of the allowable error may be accumulated, or the absolute values of error, each pertaining to one wavelet coefficient, may be accumulated. The characteristic amounts used to determine the similarity may be quantization coefficients. In this case, data items showing whether the quantization coefficients are identical for each code block, data items showing whether the quantization coefficients are identical to the last decoded digit, or the absolute values of error, each pertaining to one quantization coefficient, are accumulated. Needless to say, these data items may be weighted.

Moreover, the image-retrieving apparatus 3 according to the third embodiment may use any one of the image-comparing apparatus 4 to 7 according to the fourth to seventh embodiments.

Figure 21:
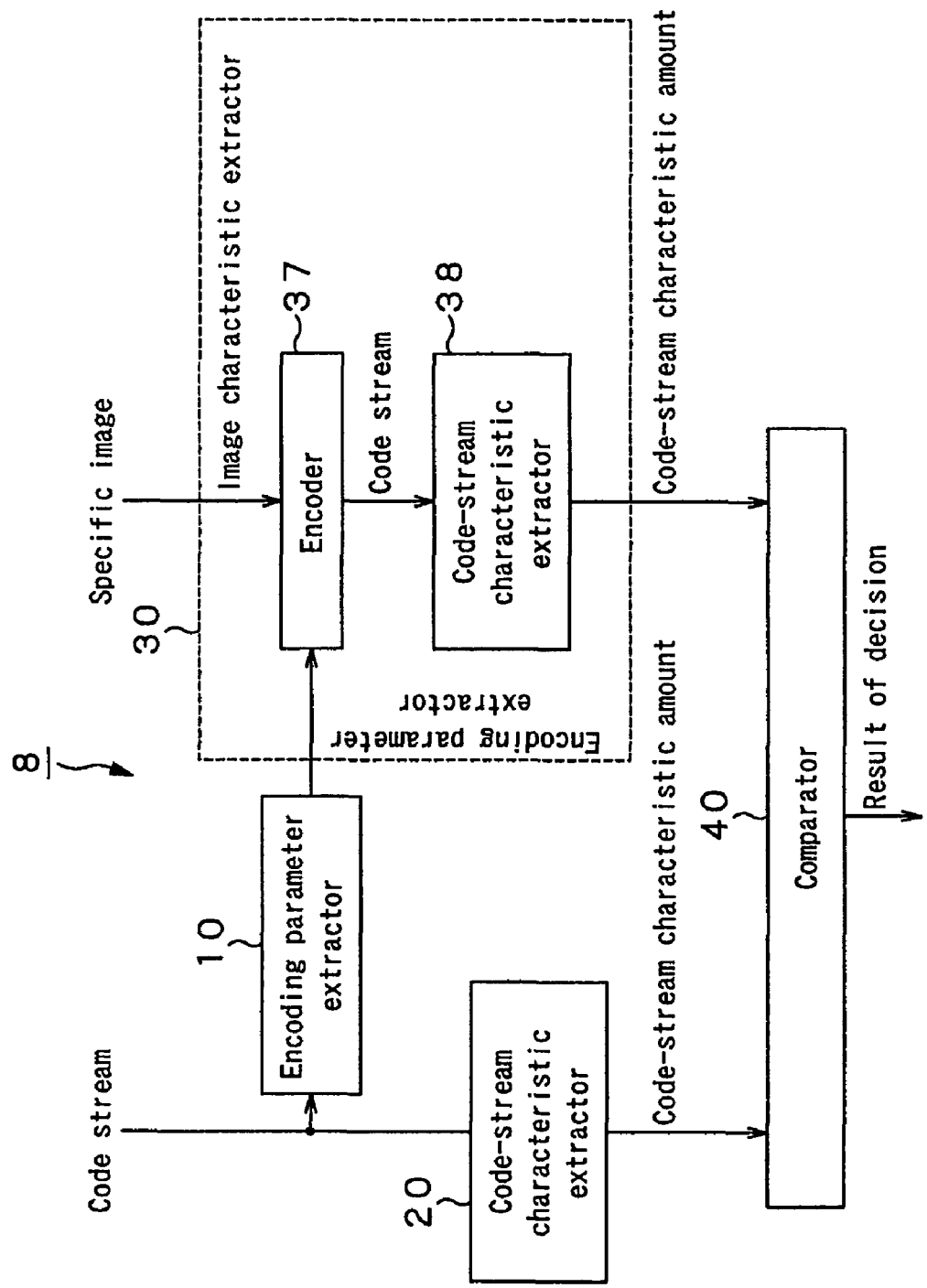
FIG. 21 is a block diagram showing the schematic configuration of an image-comparing apparatus according to another embodiment of the present invention.

In the embodiments described above, a characteristic amount is extracted before the specific image is completely encoded. Instead, the specific image may be first encoded completely, thus generating a code stream, and then the characteristic amount may be extract from this code stream. To determine whether a code stream is identical to the specific image, for example, the image characteristic amount extractor 30 is composed of an encoder 37 and a code-stream characteristic amount extractor 38 as illustrated in FIG. 21. The encoder 37 compresses and encodes the specific image in accordance with the JPEG 2000 scheme and generates a code stream. The code-stream characteristic amount extractor 38 extracts a characteristic amount from the code stream. Note that the code-stream characteristic amount extractor 38 is a device similar to the code-stream characteristic amount extractor 20. In the image-comparing apparatus 8 of FIG. 21, it suffices to arrange two identical code-stream characteristic amount extractors and one encoder of the ordinary type. The apparatus of FIG. 21 is advantageous in that it is easy to design.

As described above, the first embodiment, the second embodiment, and the fourth to seventh embodiments compare a code stream with a specific image not compressed or encoded. If the specific image has already been compressed and encoded, two code streams may be compared with each other. If these code streams have the same encoding parameter, one code-stream characteristic amount extractor may extract the characteristic amounts from both code streams, and the characteristic amounts thus extracted may be compared with each other. If the code streams have different encoding parameters, one code stream is decoded into an image, which is input to the input terminal. In this case, the image thus generated may differ from the original image. The similarity of the image must therefore be evaluated. The image should be considered as identical to the original image, if the difference between it and the original is sufficiently small.

The sequence of the process performed in each embodiment described above may be executed by using software. If this is the case, the programs constituting the software may be stored in hardware dedicated to computers, such as a ROM (Read Only Memory) or a hard disc. Various programs may be installed into a general-purpose personal computer or the like, via a network or a recording medium. The recording medium may be a magnetic disc (including a flexible disc), an optical disc (including a CD-ROM (Compact Disc-Read Only Memory), a DVD (Digital Versatile Disc), a magneto-optical disc (MD (Mini-Disc, trade name)), or a package medium such as a semiconductor memory.

The embodiments described above employ the JPEG 2000 scheme as image compression system. The image compression system is not limited to this specific one. Any other image compression system, such as JPEG or MPEG (Moving Picture Experts Group) can be applied instead.

It should be understood by those skilled in the art that various modifications, combinations, sub-combinations and alterations may occur depending on design requirements and other factors insofar as they are within the scope of the appended claims or the equivalents thereof.

What is claimed is:

1. An image-comparing apparatus for comparing a code stream obtained by encoding a retrieved image, with a specific image, to determine whether the code stream is substantially identical to the specific image, the apparatus comprising:

image-characteristic amount extracting means for analyzing the code stream to extract a zero-bit-plane number of each code block from the code stream;

encoding-parameter extracting means for extracting an encoding parameter from the code stream;

encoded-data generating means for performing wavelet transform and quantization on the specific image on a basis of the encoding parameter and then dividing a quantization coefficient into code blocks, to generate a zero-bit-plane number for each code block; and comparing means for comparing the zero-bit-plane number of each code block of the code stream with the zero-bit-plane number of that code block of the specific image, which is at the same position as the code block of the code stream, and determines, from results of comparison, whether the code stream is substantially identical to the specific image, wherein the comparing means accumulates results of a difference between the zero-bit-plane number of each code block of the code stream and the zero-bit-plane number of each code block of the specific image, and determines the similarity of the code stream and the specific image on a basis of the differences accumulated.

2. The image-comparing apparatus according to claim 1, wherein the comparing means determines similarity between the code stream and the specific image, on a basis of results of comparison between the zero-bit-plane number of each code block from the code stream of the retrieved image and the encoded specific-image data.

3. The image-comparing apparatus according to claim 2, wherein the comparing means compares the similarity with a threshold value, thereby to determine whether the code stream is substantially identical to the specific image.

4. The image-comparing apparatus according to claim 1, wherein the code stream is encoded in accordance with the JPEG 2000 scheme.

5. The image-comparing apparatus according to claim 4, wherein the comparing means determines that the code stream is substantially identical to the specific image, when all code blocks of the code stream are identical to all code blocks of the specific image, respectively, in terms of zero-bit-plane number.

6. The image-comparing apparatus according to claim 4, wherein the comparing means compares the zero-bit-plane number of each code block of the code stream with the zero-bit-plane number of the corresponding code block of the specific image, for only a specific component and/or a specific sub-band.

7. The image-comparing apparatus according to claim 4, wherein the comparing means determines similarity between the code stream and the specific image, on a basis of results of comparison, and compares the similarity with a threshold value, thereby to determine whether the code stream is substantially identical to the specific image.

8. An image-comparing apparatus for comparing a code stream obtained by encoding a retrieved image, with a specific image, thereby to determine whether the code stream is substantially identical to the specific image, the apparatus comprising:

image-characteristic amount extracting means for analyzing the code stream, thereby to extract an image-characteristic amount of the retrieved image;

encoding-parameter extracting means for extracting an encoding parameter from the code stream;

encoded-data generating means for encoding the specific image to some extent, on the basis of the encoding parameter, thereby to generate encoded specific-image data; and comparing means for comparing the image-characteristic amount of the retrieved image with the encoded specific-image data, thereby to determine whether the code stream is substantially identical to the specific image, wherein the code stream is encoded in accordance with the JPEG 2000 scheme, the image-characteristic amount extracting means extracts a zero-bit-plane number of each code block from the code stream, the encoding-parameter extracting means extracts an encoding parameter from the code stream, the encoded-data generating means performs wavelet transform and quantization on the specific image on the basis of the encoding parameter and then divides a quantization coefficient into code blocks, thereby to generate a zero-bit-plane number for each code block, and the comparing means compares the zero-bit-plane number of each code block of the code stream with the zero-bit-plane number of that code block of the specific image, which is at the same position as the code block of the code stream, and determines, from results of comparison, whether the code stream is substantially identical to the specific image wherein the comparing means accumulates results of comparison about the code blocks, thereby to determine a similarity between the code stream and the specific image;

wherein the comparing means accumulates the number of those code blocks of the code stream, which are identical to the corresponding code blocks of the specific image in terms of zero-bit-plane number, and determines the similarity from a ratio of the identical code blocks.

9. The image-comparing apparatus according to claim 8, wherein the comparing means applies a weight to the number accumulated, in accordance with a type of a component and/or a position of a sub-band.

10. An image-comparing apparatus for comparing a code stream obtained by encoding a retrieved image, with a specific image, thereby to determine whether the code stream is substantially identical to the specific image, the apparatus comprising:

image-characteristic amount extracting means for analyzing the code stream, thereby to extract an image-characteristic amount of the retrieved image;

encoding-parameter extracting means for extracting an encoding parameter from the code stream;

encoded-data generating means for encoding the specific image to some extent, on the basis of the encoding parameter, thereby to generate encoded specific-image data; and comparing means for comparing the image-characteristic amount of the retrieved image with the encoded specific-image data, thereby to determine whether the code stream is substantially identical to the specific image, wherein the code stream is encoded in accordance with the JPEG 2000 scheme, the image-characteristic amount extracting means extracts a zero-bit-plane number of each code block from the code stream, the encoding-parameter extracting means extracts an encoding parameter from the code stream, the encoded-data generating means performs is wavelet transform and quantization on the specific image on the basis of the encoding parameter and then divides a quantization coefficient into code blocks, thereby to generate a zero-bit-plane number for each code block, and the comparing means compares the zero-bit-plane number of each code block of the code stream with the zero-bit-plane number of that code block of the specific image, which is at the same position as the code block of the code stream, and determines, from results of comparison, whether the code stream is substantially identical to the specific image wherein the comparing means accumulates results of comparison about the code blocks, thereby to determine a similarity between the code stream and the specific image, wherein the comparing means accumulates a difference between the zero-bit-plane number of each code block of the code stream and the zero-bit-plane number of each code block of the specific image, and determines the similarity on a basis of the differences accumulated.

11. An image-comparing method of comparing a code stream obtained by encoding a retrieved image, with a specific image, to determine whether the code stream is substantially identical to the specific image, the method comprising the steps of:

analyzing the code stream, to extract a zero-bit-plane number of each code block from the code stream;

extracting an encoding parameter from the code stream;

performing wavelet transform and quantization on the specific image on a basis of the encoding parameter and then dividing a quantization coefficient into code blocks, to generate a zero-bit-plane number for each code block; and comparing the zero-bit-plane number of each code block of the code stream with the zero-bit-plane number of that code block of the specific image, which is at the same position as the code block of the code stream, and determining, from results of comparison, whether the code stream is substantially identical to the specific image, wherein the comparing step includes accumulating results of a difference between the zero-bit-plane number of each code block of the code stream and the zero-bit-plane number of each code block of the specific image, and determines the similarity of the code stream and the specific image on a basis of the differences accumulated.

12. An image-retrieving apparatus for retrieving a code stream substantially identical to a specific image from a code-stream train obtained by encoding a plurality of images, the apparatus comprising:

image-characteristic amount extracting means for analyzing the code stream constituting the code-stream train, to extract a zero-bit-plane number of each code block from the code stream;

encoding-parameter extracting means for extracting an encoding parameter from the code stream;

encoded-data generating means for performing wavelet transform and quantization on the specific image on a basis of the encoding parameter and then dividing a quantization coefficient into code blocks, to generate a zero-bit-plane number for each code block; and retrieving means for comparing the zero-bit-plane number of each code block of the code stream with the zero-bit-plane number of that code block of the specific image, which is at the same position as the code block of the code stream, and determine, from results of comparison, whether the code stream is substantially identical to the specific image, wherein the retrieving means accumulates results of a difference between the zero-bit-plane number of each code block of the code stream and the zero-bit-plane number of each code block of the specific image, and determines the similarity of the code stream and the specific image on a basis of the differences accumulated.

13. The image-retrieving apparatus according to claim 12, further comprising selecting means for selecting and outputting an index of the code stream determined to be substantially identical to the specific image.

14. The image-retrieving apparatus according to claim 13, wherein the retrieving means determines similarity between the code stream and the specific image, and the selecting means selects and outputs the index of a code stream that has similarity exceeding a threshold value.

15. The image-retrieving apparatus according to claim 12, wherein the code-stream train has been obtained by performing encoding in accordance with the JPEG 2000 scheme.

16. An image-retrieving method of retrieving a code stream substantially identical to the specific image from a code-stream train obtained by encoding a plurality of images, the method comprising the steps of:

analyzing the code stream constituting the code-stream train, to extract a zero-bit-plane number of each code block from the code stream;

extracting an encoding parameter from the code stream;

performing wavelet transform and quantization on the specific image on a basis of the encoding parameter and then dividing a quantization coefficient into code blocks, to generate a zero-bit-plane number for each code block; and comparing the zero-bit-plane number of each code block of the code stream with the zero-bit-plane number of that code block of the specific image, which is at the same position as the code block of the code stream, and determines, from results of comparison, whether the code stream is substantially identical to the specific image, wherein the comparing step includes accumulating results of a difference between the zero-bit-plane number of each code block of the code stream and the zero-bit-plane number of each code block of the specific image, and determines the similarity of the code stream and the specific image on a basis of the differences accumulated.

17. An image-comparing apparatus for comparing a code stream obtained by encoding a retrieved image, with a specific image, to determine whether the code stream is substantially identical to the specific image, the apparatus comprising:

an image-characteristic amount extracting section that analyzes the code stream, to extract a zero-bit-plane number of each code block from the code stream;

an encoding-parameter extracting section that extracts an encoding parameter from the code stream;

an encoded-data generating section for performing wavelet transform and quantization on the specific image on a basis of the encoding parameter and then dividing a quantization coefficient into code blocks, to generate a zero-bit-plane number for each code block; and a comparing section that compares the zero-bit-plane number of each code block of the code stream with the zero-bit-plane number of that code block of the specific image, which is at the same position as the code block of the code stream, and determine, from results of comparison, whether the code stream is substantially identical to the specific image, wherein the comparing section accumulates results of a difference between the zero-bit-plane number of each code block of the code stream and the zero-bit-plane number of each code block of the specific image, and determines the similarity of the code stream and the specific image on a basis of the differences accumulated.

18. An image-retrieving apparatus for retrieving a code stream substantially identical to the specific image from a code-stream train obtained by encoding a plurality of images, the apparatus comprising:

an image-characteristic amount extracting section that analyzes the code stream constituting the code-stream train, to extract a zero-bit-plane number of each code block from the code stream;

an encoding-parameter extracting section that extracts an encoding parameter from the code stream;

an encoded-data generating section that performs wavelet transform and quantization on the specific image on a basis of the encoding parameter and then divides a quantization coefficient into code blocks, to generate a zero-bit-plane number for each code block; and a retrieving section that compares the zero-bit-plane number of each code block of the code stream with the zero-bit-plane number of that code block of the encoded specific-image data, to determine whether the code stream is substantially identical to the specific image, and retrieves, from the code-stream train, the code stream substantially identical to the specific image, wherein the retrieving section accumulates results of a difference between the zero-bit-plane number of each code block of the code stream and the zero-bit-plane number of each code block of the specific image, and determines the similarity of the code stream and the specific image on a basis of the differences accumulated.

19. A program embedded in a non-transitory computer readable medium for controlling a processor to implement a method of retrieving a code stream substantially identical to the specific image from a code-stream train obtained by encoding a plurality of images, the program comprising instructions to control the processor to perform the method of:

analyzing the code stream constituting the code-stream train, to extract a zero-bit-plane number of each code block from the code stream;

extracting an encoding parameter from the code stream;

performing wavelet transform and quantization on the specific image on a basis of the encoding parameter and then dividing a quantization coefficient into code blocks, to generate a zero-bit-plane number for each code block; and comparing the zero-bit-plane number of each code block of the code stream with the zero-bit-plane number of that code block of the specific image, which is at the same position as the code block of the code stream, and determines, from results of comparison, whether the code stream is substantially identical to the specific image, wherein the comparing step includes accumulating results of a difference between the zero-bit-plane number of each code block of the code stream and the zero-bit-plane number of each code block of the specific image, and determines the similarity of the code stream and the specific image on a basis of the differences accumulated.

20. A non-transitory computer readable medium having stored thereon a program for retrieving a code stream substantially identical to the specific image from a code-stream train obtained by encoding a plurality of images, wherein the program comprises:

analyzing the code stream constituting the code-stream train, to extract a zero-bit-plane number of each code block from the code stream;

extracting an encoding parameter from the code stream;

performing wavelet transform and quantization on the specific image on a basis of the encoding parameter and then dividing a quantization coefficient into code blocks, to generate a zero-bit-plane number for each code block; and comparing the zero-bit-plane number of each code block of the code stream with the zero-bit-plane number of that code block of the specific image, which is at the same position as the code block of the code stream, and determines, from results of comparison, whether the code stream is substantially identical to the specific image, wherein the comparing step includes accumulating results of a difference between the zero-bit-plane number of each code block of the code stream and the zero-bit-plane number of each code block of the specific image, and determines the similarity of the code stream and the specific image on a basis of the differences accumulated.

* * * * *